United States Patent [19]
Kelley et al.

[11] Patent Number: 5,678,493
[45] Date of Patent: Oct. 21, 1997

[54] BOILER FLUE GAS CONDITIONING SYSTEM

[75] Inventors: Wilson Eugene Kelley, 6600 New Cut Rd., Fairdale, Ky. 40118; Robert A. Wright, Indianapolis, Ind.

[73] Assignee: Wilson Eugene Kelley, Fairdale, Ky.

[21] Appl. No.: 512,188

[22] Filed: Aug. 7, 1995

[51] Int. Cl.$^6$ .................................................. F23N 5/00
[52] U.S. Cl. .......................... 110/185; 110/345; 95/3; 95/71; 96/19; 96/52
[58] Field of Search ........................... 110/185, 188, 110/101, 345; 95/3, 64, 65, 71, 72; 96/19, 52, 53

[56] References Cited

U.S. PATENT DOCUMENTS

| | | | |
|---|---|---|---|
| 3,300,282 | 1/1967 | Risk et al. | 23/232 |
| 4,060,589 | 11/1977 | Hass et al. | 423/244 |
| 4,146,371 | 3/1979 | Melcher et al. | 95/71 |
| 4,770,674 | 9/1988 | Tellini et al. | 55/5 |
| 4,793,270 | 12/1988 | Karasek et al. | 110/342 |
| 4,843,980 | 7/1989 | Markham et al. | 110/342 |
| 5,011,516 | 4/1991 | Altman et al. | 55/5 |
| 5,024,681 | 6/1991 | Chang | 55/6 |
| 5,032,154 | 7/1991 | Wright | 55/106 |
| 5,122,162 | 6/1992 | Krigmont et al. | 55/5 |
| 5,123,936 | 6/1992 | Stone et al. | 95/71 |
| 5,261,931 | 11/1993 | Wright | 95/3 |
| 5,321,274 | 6/1994 | Yeh et al. | 96/19 |
| 5,449,390 | 9/1995 | Duncan et al. | 96/52 |
| 5,540,755 | 7/1996 | Spokiyny et al. | 95/3 |

*Primary Examiner*—John T. Kwon
*Attorney, Agent, or Firm*—Ice Miller Donadio & Ryan

[57] ABSTRACT

A flue gas conditioning system generates sulfur trioxide which is injected into boiler flue gas to condition it by reducing the resistance of the particulate matter entrained in the flue gas. The conditioned flue gas is passed through an electrostatic precipitator which collects the particulate matter by electrostatic precipitation. The sulfur trioxide concentration in the flue gas is measured with a mass spectrometer downstream of where the sulfur trioxide was injected into the flue gas and upstream of the electrostatic precipitator. The concentration of the sulfur trioxide in the flue gas is measured with a mass spectrometer at a point where the injected sulfur trioxide has uniformly mixed with the flue gas. The measured sulfur trioxide concentration is used to control the flue gas conditioning system, such as by comparing the measured concentration to a desired concentration range and adjusting the amount of sulfur trioxide being injected into the flue gas accordingly.

20 Claims, 12 Drawing Sheets

5,678,493

1

BOILER FLUE GAS CONDITIONING SYSTEM

TECHNICAL FIELD

This invention relates to a system for treating particulate-laden boiler flue gas with a conditioning agent to improve the removal of particulate matter by electrostatic means and, more particularly, to an improved control of a $SO_3$ flue gas-conditioning system by measuring the chemistry of the flue gas and using the measured chemistry as a control parameter to control the flue gas-conditioning system.

BACKGROUND ART

Electrical utilities must burn increasing quantities of fossil fuels to satisfy the ever-increasing demand for electric power. At the same time, electric utilities face increasing clean-air standards that are imposed upon their operation. In trying to satisfy the divergent demands of increasing power and decreased air pollution, electrical utilities have turned to using low-sulfur coals to fire their boilers and generate the steam needed for electrical power generation.

Electrical utilities have long relied upon electrostatic means such as electrostatic precipitators to remove particulate matter from boiler flue gas. The efficiency of operation of the electrostatic precipitators in the removal of particulate matter from boiler flue gas is dependent, in part, upon the electrical resistivity of the entrained particulate matter in boiler flue gas. It has been found that where a boiler is fired with low sulfur content coal, the entrained particulate matter in the boiler flue gas has a high resistivity, for example, $10^{13}$ ohm-cm resistance and more. It has also been determined that the most efficient removal of particulate matter by electrostatic precipitation occurs When its resistivity is on the order of about 10 sup 8 ohm-cm and that when the resistivity of the particulate matter is higher, for example, on the order of 10 sup 13 ohm-cm, the efficiency of electrostatic precipitation is substantially reduced. Thus, reduced efficiency in the operation of electrostatic precipitators with the flue gas from low-sulfur coals has been attributed to the higher resistivity of such flue gas particles. Any reduction of the ability of an electrostatic precipitator to remove particles from the flue gas can offset, of course, the reduced or potentially reduced air pollution sought through the use of the more expensive low-sulfur coals.

One solution to this problem has been to condition the boiler flue gas prior to its entrance into the electrostatic precipitator by the use of a conditioning agent to reduce the resistivity of the entrained particles within the boiler flue gas. Among the various chemicals which have been used as conditioning agents for boiler flue gas are water, anhydrous ammonia and various ammonia-bearing solutions, sulfuric acid, sulfur trioxide and phosphoric acid.

U.S. Pat. No. 2,864,456 discloses an automatic control for electrostatic precipitators which varies both the electrostatic precipitator voltage and the supply of a conditioning agent such as water for particles to be removed by the electrostatic precipitator, to maintain an optimum sparking rate for efficient particle removal.

U.S. Pat. No. 3,284,990 discloses a method of improving the electrostatic precipitation of particles by adding phosphorous pentoxide to the particles prior to their electrostatic precipitation.

U.S. Pat. No. 3,523,407 discloses a method of improving the electrostatic precipitation of particles from a flue gas by adding preselected amounts of ammonia and water to the flue gas.

2

U.S. Pat. No. 3,665,676 discloses a system to condition the particles of boiler flue gas by the use of a salt solution such as a solution of ammonium sulfate or ammonium bisulfate. The salt solution is injected into the flue gas prior to entering the electrostatic precipitator and the system includes a metering means for controlling the amount of conditioner injected into the flue gas. U.S. Pat. No. 3,665,676 indicates that, if desired, conventional automatic controls can be provided to open the metering means when the flue gas reaches the desired operating temperature or to close it should the temperature fall below operating temperature. In addition, automatic controls can also be made to open the metering means to provide the amount of conditioner needed in proportion to the volume of gas to be conditioned.

U.S. Pat. No. 3,689,213 discloses a process for treating flue gas in which gaseous sulfur trioxide is generated in the immediate vicinity of the point of use as required by the quantity of fossil fuel being burned per unit time and is then introduced into the flue gas at a predetermined rate to facilitate fly ash removal by art electrostatic precipitator. In the system of U.S. Pat. No. 3,689,213, air and gaseous sulfur dioxide are heated in a heat exchanger to a temperature required for oxidation of sulfur dioxide to sulfur trioxide. The air and sulfur dioxide are passed through a catalytic converter for conversion of the sulfur dioxide to sulfur trioxide prior to its injection into the boiler flue gas.

U.S. Pat. No. 3,722,178 discloses a system for the production of sulfur trioxide for flue gas conditioning including means to deliver a source of sulfur such as sulfuric acid to a vaporizer in proportion to the amount of flue gas from the boiler measured in terms of the electrical output generated at a particular time. As the production of flue gas changes in the boiler system, the proper ratio of acid to flue gas is automatically maintained by a control responsive to a signal coming from a boiler capacity index gauge to control the volume of sulfur trioxide being produced. The vaporizer is provided with a mixture of fresh air and a combustion gas from a natural gas or oil, to convert the sulfuric acid to sulfur trioxide. The amount of combustion gas directed into the combustion chamber is automatically controlled by the exit temperature of the sulfur trioxide as indicated by temperature controllers mounted at the top and bottom of the vaporizer in the path of the output gas. The temperature controllers maintain the temperature of the vaporizer in the range for efficient production of sulfur trioxide. An additional temperature controller at the exit of the vaporizer turns off the burner when the temperature at the exit exceeds 1200 degree(s) F. (649 degree(s) C.).

More recent developments have centered on sulfur trioxide as a flue gas-conditioning material. Such flue gas-conditioning systems have included systems which store liquefied sulfur which is fed to a sulfur burner in which the sulfur is converted by combustion predominantly to sulfur dioxide. The systems then pass the sulfur dioxide to a catalytic converter which employs a vanadium pentoxide catalyst to convert the sulfur dioxide into sulfur trioxide. The sulfur trioxide created by such systems is piped to a nozzle system for injection into ducts carrying the boiler flue gas and its entrained particulate material to reduce the electrical resistivity of the flue gas particulate matter for removal by an electrostatic precipitator.

As reported in "Sulfur Trioxide Conditioning", Journal of the Air Pollution Control Association, Vol. 25, No. 2, February 1975, pp. 156–158, such systems have been in commercial use since 1972.

A number of prior systems have been disclosed to control such $SO_3$ flue gas-conditioning systems. Such a system is disclosed, for example, in U.S. Pat. No. 3,993,429. In the system of U.S. Pat. No. 3,993,429 and in commercial systems resulting from this patent, a flow of heated air is forced into the sulfur burner; the temperature of the gas leaving the sulfur burner is sensed; and the sensed output temperature of the sulfur burner is used to control either the temperature of a flow of air forced into the sulfur burner, or the portion of a flow of heated air that is forced into the sulfur burner. The system of U.S. Pat. No. 3,993,429 increases or decreases the temperature of the air directed into the sulfur burner, or the portion of the heated air directed into the sulfur burner, in the event the burner outlet temperature is too low or too high, respectively. The system of U.S. Pat. No. 3,993,429 thus attempts to regulate the operating temperature of the sulfur burner and the catalytic converter downstream of the sulfur burner by regulating an air heater or an air flow diverter valve, or both, upstream of the sulfur burner. U.S. Pat. No. 3,993,429 also discloses a system in which the temperature of operation of the catalytic converter is controlled by providing a second flow of air to be mixed with the output of the sulfur burner, detecting the temperature of the mixture of the second flow of air and the gases leaving the sulfur burner and varying the temperature of the air in the second flow of air to maintain a desired operating temperature for the catalytic converter. U.S. Pat. No. 3,993,429 further discloses that $SO_3$ flue gas-conditioning systems can operate by sensing the rate of coal combustion and varying the rate of flow of sulfur into a sulfur burner in response to the rate of coal combustion.

U.S. Pat. No. 4,284,417 discloses a system for regulating electric power supplied to the corona-generating electrodes of an electrostatic precipitator in response to changes in opacity of the flue gas exiting from the precipitator to control and minimize electric power consumption. In the system of U.S. Pat. No. 4,284,417, an output of an opacity transducer, which is a measure of the opacity of the flue gas, is directed to a controller for the electric power supplied to the corona-generating electrodes of the electrostatic precipitator. If the opacity of the flue gas exceeds a high opacity limit set in the controller, the controller increases the power to the corona-generating electrodes; and if the opacity of the flue gas is less than the low opacity limit, the controller decreases the power to the corona-generating electrodes.

U.S. Pat. No. 4,624,685 discloses a system for optimizing the power consumption of an electrostatic precipitator. The system of U.S. Pat. No. 4,624,685 includes a controller for the transformer-rectifier sets of the electrostatic precipitator that determines the corona power required to reduce flue gas particulate matter below the environmental limit from a load indexed transducer, data input to the system and stored data and algorithms. The precipitator power is then reduced or trimmed in response to an average measured opacity of the flue gas to provide minimal precipitation power consumption consistent with meeting the environmental limit.

U.S. Pat. No. 4,770,674 discloses a system for conditioning flue gas for an electrostatic precipitator, including equipment for converting sulfur into sulfur trioxide. The disclosed systems of U.S. Pat. No. 4,770,674 include a sulfur burner to produce oxidized sulfur, a catalytic converter to convert the oxidized sulfur to sulfur trioxide, and means to control sulfur and air inputs to the sulfur burner. Various inputs to the control means are disclosed, including the outlet temperature of the catalytic converter and such operating parameters of the exhaust stage of the system as the output temperature of the exhaust gas from the precipitator, the flow rate of the exhaust gas, the power delivered to or the speed of, an induced draft fan, if any, the opacity of the exhaust gas within the stack, and the power dissipated by the precipitator.

U.S. Pat. No. 4,779,207 discloses a system for preconditioning flue gas for electrostatic precipitation. The system of U.S. Pat. No. 4,779,207 includes a source of an $SO_3$ conditioning agent, a means for controllably adding the conditioning agent to the flue gas, a means for detecting the input power level of the electrostatic precipitators and control means for monitoring the input power level and controlling the amount of conditioning agent added to the gas to substantially maintain input power to the electrostatic precipitator to predetermined levels.

U.S. Pat. Nos. 5,032,154 and 5,261,931, which are owned by the assignee of this application, disclose flue gas conditioning systems which provide a controlled flow of sulfur trioxide into a boiler flue gas and its entrained particulate material ahead of an electrostatic precipitator. The systems monitor the opacity of the stack effluent and precipitator power and operate to maintain a flow of sulfur trioxide into the boiler flue gas to provide minimal opacity of the stack effluent. The systems operate at a sulfur trioxide flow rate corresponding to minimal opacity of the stack effluent and to eliminate corrections that may be due to transient operating conditions such as boiler upsets, precipitator rapping and the like. The systems include features providing improved conversion of sulfur dioxide into sulfur trioxide, integrated assemblies to provide a flow of sulfur dioxide and sulfur dioxide conversion units adapted to convert sulfur trioxide into sulfur dioxide at a plurality of remote sulfur trioxide injection sites.

Other conditioning systems are shown, for example, in U.S. Pat. Nos. 3,686,825; 4,042,348; 4,333,746; 4,466,815 and 4,533,364.

DISCLOSURE OF INVENTION

This invention is to measure the chemistry of the flue gas, particularly by using a mass spectrometer. The measured chemistry is used as a control parameter(s) for the control of flue gas conditioning systems, such as a sulfur trioxide flue gas conditioning system.

In preferred embodiments of the invention, flue gas chemistry is used to control a flue gas conditioning system where sulfur trioxide is used to condition the flue gas by reducing the resistance of the particulate matter in the flue gas for removal by electrostatic means. These embodiments of the invention are illustratively described as adaptations of the systems disclosed in the above mentioned U.S. Pat. Nos. 5,032,154 and 5,261,931.

Illustratively, the sulfur trioxide is generated by the combustion of sulfur and the conversion of the products of sulfur combustion to sulfur trioxide. By measuring the chemistry of the flue gas, the impact of spurious and transient effects of operation of the boiler or electrostatic particle-removing means is minimized and incomplete and inefficient combustion of sulfur and inefficient conversion of the combusted sulfur products into sulfur trioxide are reduced.

In an illustrative embodiment of this invention, a flow of sulfur is provided at a controlled rate to a sulfur burner for combustion; and the products of combustion are directed to a catalytic converter for conversion to a gas stream containing sulfur trioxide. The boiler flue gas and particulate matter to be conditioned are mixed with the system gas stream containing sulfur trioxide and directed through electrostatic means for removal of the particulate matter to provide a cleaner stack effluent. In this embodiment of this invention, the coal to be burned is analyzed to determine its sulfur content. The desired concentration of sulfur trioxide to be achieved in the flue gas is determined based on the sulfur content of the coal. Alternatively, the sulfur dioxide concentration of the flue gas is measured and the desired concentration of sulfur trioxide determined based on the sulfur dioxide concentration. The desired sulfur trioxide concentration, which is illustratively a range, is entered into the memory of the system controller. The concentration of the sulfur trioxide in the flue gas, upstream of the electrostatic precipitator, is periodically measured, illustratively with a mass spectrometer, and the rate of flow of sulfur is periodically determined. The system varies the rate of sulfur flow in response to the measured concentration of the sulfur trioxide in the flue gas until the measured sulfur trioxide concentration reaches the desired concentration, illustratively, falls within the desired range. When the measured sulfur trioxide concentration falls within the desired range, the rate of sulfur flow is maintained.

In addition, the power used by the electrostatic particle removal means and the opacity of the stack effluent can also be periodically sampled and the rate of sulfur flow adjusted accordingly as discussed in U.S. Pat. No. 5,261,931 which is herein incorporated by reference.

In illustrative embodiments of the invention, the temperature of the gas stream containing sulfur trioxide can be sensed at the output of the catalytic converter and prior to its mixture with the boiler flue gas; and the system can operate to prevent a flow of sulfur to the sulfur burner if the system is not at satisfactory operating temperatures, thus permitting the system to reach operating temperature before an attempt is made to generate sulfur trioxide and preventing the inefficient and ineffective conversion of sulfur into sulfur trioxide during operation.

The system of the invention comprises a source of conditioning agent, preferably sulfur trioxide, deliverable at a controlled rate, means for conditioning the particulate matter of a boiler flue gas with the conditioning agent, an electrostatic means for removal of the particulate matter from the boiler flue gas and means to measure the chemistry of the flue gas, illustratively the concentration of sulfur trioxide in the flue gas, upstream of the electrostatic means. Illustratively, the flue gas chemistry measuring means is a mass spectrometer. In the invention, a controller includes means for storing data on the operation of the system including a desired sulfur trioxide concentration level and means for operating the source Of conditioning agent to obtain the desired sulfur trioxide concentration. The desired sulfur trioxide concentration level, which may be a range, is determined by the sulfur content of the coal to be burned or by periodically measuring the sulfur dioxide concentration in the flue gas. The controller is connected with the mass spectrometer which periodically measures the sulfur trioxide concentration in the flue gas and provides the measurement to the controller. Illustratively, the sulfur trioxide concentration is measured at intervals of several minutes. The controller determines whether the measured sulfur trioxide concentration falls within the desired range and if it does not, varies the rate of sulfur flow accordingly to bring the sulfur trioxide concentration within the desired range. The extent to which the rate of conditioning agent flow is increased or decreased may be by a fixed increase or decrease in the rate of flow, or the rate of conditioning agent flow may be increased or decreased in accordance with an algorithm developed to provide a more rapid approach to obtaining the desired sulfur trioxide concentration level.

Other features and advantages of the invention will become apparent from the drawings and detailed description which follow.

BEST MODE FOR CARRYING OUT THE INVENTION

Figure 1:
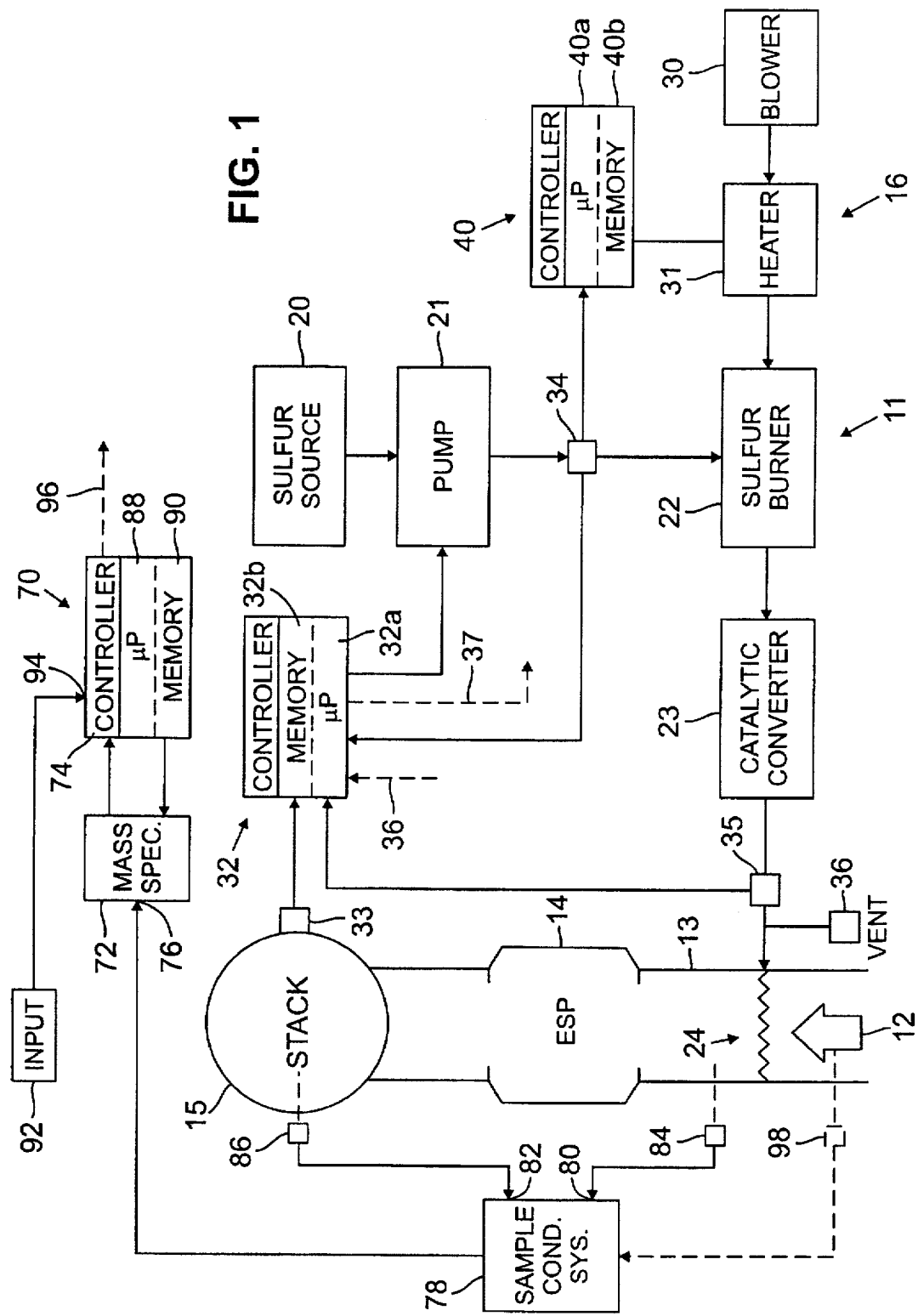
FIG. 1 is a diagrammatic drawing of a preferred system of the invention.

A system 10 incorporating the invention is shown in FIG. 1. To clarify the presentation of the invention, venting valves and lines, heating and temperature controlling means for the sulfur source, shut-off valves and temperature pressure and level gauges have been omitted from FIG. 1 and the other drawings; but one skilled in the art will recognize that the systems of this invention can include such valves, gauges and venting means as are necessary to the convenient operation, control and maintenance of the system.

System 10 includes generally a source of conditioning agent, preferably a means 11 for providing a flow of sulfur trioxide to a flow of particulate-laden boiler flue gas, indicated generally by arrow 12, within a duct or conduit 13 upstream of an electrostatic means 14 for removing particulate matter from the boiler flue gas prior to its expulsion to atmosphere from a stack 15. Such a sulfur trioxide source 11 is preferably designed to provide sulfur trioxide sufficient to condition the particulate matter of a boiler flue gas ranging from 3 $g/m^3$ stp to about 10 $g/m^3$ stp and to provide an $SO_3$ concentration of preferably 20 to 30 ppm and generally less than 40 ppm. As set forth below, the source of conditioning agent is controlled by a controller 32 to provide conditioning agent at controlled rates to obtain and maintain optimal flue gas chemistry, e.g., maintain the concentration of $SO_3$ within a desired range.

The preferable source of conditioning agent shown in FIG. 1 comprises means 11, for producing a flow of sulfur trioxide, including a sulfur source 20, a means 21 (such as a pump) for delivering a flow of sulfur from source 20 to a sulfur burner 22 and a catalytic converter 23 to convert the products of combustion of sulfur from sulfur burner 22 into sulfur trioxide. In FIG. 1, the sulfur trioxide from catalytic converter 23 is directed to a boiler flue gas-conditioning means 24 for introducing sulfur trioxide into the boiler flue gas and its entrained particulate matter upstream of electrostatic precipitator 14. Means 24 may include a plurality of nozzles or injectors for introducing sulfur trioxide into the flowing boiler flue gas and baffles or other means upstream and/or downstream of the plurality of nozzles to achieve exposure of the particulate matter carried by the boiler flue gas to the sulfur trioxide so that the sulfur trioxide effectively conditions the particulate matter for removal by electrostatic precipitator 14.

Sulfur source 20 can be either an insulated, steam-heated, steel container or a concrete-lined storage pit placed largely underground and is preferably adapted to contain liquefied sulfur. The tank or concrete pit can contain a heater or heat exchanger in intimate contact with the sulfur to liquefy the sulfur and to keep the liquefied sulfur at the preferred temperature for minimum viscosity and pumping. The heat exchanger within sulfur source 20 may be any heat exchanger suitable for this purpose and may be provided with any source or heat, such as steam or the output of a suitable oil or gas burner.

Means 21 to deliver sulfur from source 20 to sulfur burner 22 is preferably a positive-displacement pump, such as a gear pump or vane pump, driven by a variable speed electric motor to deliver a flow of liquefied sulfur at a controllable rate. In preferable systems, the positive displacement pump may be immersed within the liquefied sulfur to simplify the installation, improve operating characteristics and eliminate pump seal problems. Where, as in preferred systems of this invention, the source of sulfur includes a steel tank or a concrete pit buried in the ground, the variable speed electric motor and its control for means 21 can be placed in a protected enclosure mounted on the tank or on a support that covers the pit and provides thermal insulation between the exterior atmosphere and the liquefied sulfur within the pit. The variable speed electric drive for the vane pump or gear pumps that pump sulfur at a controlled rate may be any commercially available variable speed electric motor drive with sufficient power output to provide a flow of sulfur at rates of, for example, one to five lb./min. (0.45–2.26 kg./min.) and a pressure of 60–100 psi (4218–7030 gm/cm$_2$). Since liquefied sulfur is easy to pump, e.g., having a viscosity on the order of water and being non-abrasive, it will be apparent to those skilled in the art that a number of commercially available positive-displacement pumps may be used in means 21.

Sulfur burner 22 and catalytic converter 23 are the type known to those skilled in the art. The sulfur burner is the type frequently referred to as a "checker work" or a "cascade burner" operable preferably in the range of 800 degree(s) F. to 850 degree(s) F. (427 degree(s) C. to 454 degree(s) C.) to oxidize the liquefied sulfur into sulfur dioxide through combustion. The catalytic converter is likewise a structure and converter well-known in the art which is capable of catalytically converting sulfur dioxide to sulfur trioxide through the action of a vanadium pentoxide catalyst. The converter contains vanadium pentoxide generally applied to the surface of ceramic elements; and as sulfur dioxide passes through the catalytic converter, it is exposed to the catalyst and is converted into sulfur trioxide. It is well known in the art that such catalytic converters preferably operate at a temperature range from about 750 degree(s) F. to about 1075 degree(s) F. (399 degree(s) C. to 579 degree(s) C.) and, preferably, at about 850 degree(s) F. (454 degree(s) C.). It is also well known in the art that below temperatures of about 750 degree(s) F. (399 degree(s) C.) and above temperatures of about 1100 degree(s) F. (593 degree(s) C.) such catalytic converters are not efficient in converting sulfur dioxide into sulfur trioxide.

As shown in FIG. 1, the system also includes a means 16 for providing a heated flow of air to means 11 for providing a flow of sulfur trioxide. Means 16 for providing a heated flow of air includes a means 30, such as a blower, to provide a flow of air to sulfur burner 22 and a means 31, such as a heater, to heat the air from air flow means 30 prior to its entry into sulfur burner 22. Air flow means 30 may be a commercial air blower of a type known to those skilled in the art. The size of the blower and its electric motor drive will depend upon the capacity of sulfur trioxide source 11. The air flow from blower 30 is directed through heater 31 and from heater 31 through sulfur burner 22 and catalytic converter 23 and is then directed into duct 13 for the boiler flue gas. Air flow means 30 and air heater means 31 comprise in combination means 16 to heat sulfur trioxide source 11; particularly, means 30 and 31 comprise collectively a controllable means to heat sulfur burner 22 and catalytic converter 23 to satisfactory operating temperatures and, preferably, their preferred operating temperatures. Accordingly, the blower of means 30 and the heater of means 31 are designed to provide a flow of air through sulfur burner 22 to catalytic converter 23 at temperatures in excess of about 750 degree(s) F. (399 degree(s) C.) and, preferably, on the order of 800 degree(s) F. to about 850 degree(s) F. (427 degree(s) C. to 454 degree(s) C.). Means 16, comprising air flow means 30 and air flow-heating means 31, may be operated to bring sulfur trioxide source 11 to its preferred operating temperatures within reasonable times and to maintain sulfur trioxide source 11 at its preferred operating temperatures during standby periods.

In accordance with the invention, the system of FIG. 1 is provided with control means 32 comprising, preferably, a data processor, such as a microprocessor 32$a$ and a data storage means 32$b$, such as a non-volatile RAM storage device, that operate to provide a controller for controlling the production of sulfur trioxide. As described below, control means 32 cooperates with flue gas chemistry measuring means 70 to maintain the flue gas chemistry, illustratively the concentration of sulfur trioxide, within a desired range.

Control means 32 controls means 21 for providing sulfur at a controlled rate to sulfur burner 22. Control means 32 is coupled to flue gas chemistry measuring means 70 which provides control means 32 information indicative of whether the flue gas chemistry is within a desired range. Illustratively, flue gas chemistry measuring means 70 provides signals to control means 32 indicating whether the flue gas chemistry is high, low or within a desired range. In the embodiment of FIG. 1, flue gas measuring means 70 measures the sulfur trioxide concentration of the flue gas in duct 13 upstream of electrostatic precipitator means 14 and downstream of flue gas conditioning means 24 at a point where the sulfur trioxide introduced in the flue gas by means 24 has been largely uniformly mixed with the flue gas.

In the preferred system of FIG. 1, controller 32 can determine or calculate the rate of sulfur flow from the known operation of the preferred positive displacement pumps of means 21, or controller 32 may be connected with a flow meter 34, as shown in FIG. 1, that provides a signal proportional to the rate at which sulfur is being provided to sulfur burner 22 by sulfur pump means 21. Finally, controller 32 is connected with a temperature sensor 35 that either provides controller 32 with a signal proportional to the temperature of the gas leaving catalytic converter 23 or provides controller 32 with a signal indicating that the gas flowing from catalytic converter 23 is outside the satisfactory operating temperature range of the catalytic converter. Preferably, temperature sensor 35 is adapted to provide controller 32 with a signal indicating the output of the catalytic converter is less than about 725 degree(s) F. (385 degree(s) C.) or greater than about 1200 degree(s) F. (649 degree(s) C.) or with a signal proportional to the temperature of the output of catalytic converter 23 that permits controller 32 to determine if the output of catalytic converter 23 is less than 725 degree(s) F. (385 degree(s) C.) or more than 1200 degree(s) F. (649 degree(s) C.).

Flue gas chemistry measuring means 70 illustratively comprises a mass spectrometer 72 coupled to a mass spectrometer control means 74, which is coupled to control means 32. Mass spectrometer control means 74 illustratively comprises a microprocessor 88 and a data storage means 90, such as a non-volatile RAM storage device, that operate to provide a controller which controls mass spectrometer 72 and provides data and/or signals related to the flue gas chemistry, such as sulfur trioxide concentration, to control means 32. While the embodiment of FIG. 1 shows a separate control means 32 for controlling the production of sulfur trioxide and a separate control means 74 for controlling mass spectrometer 72, control means 32 can also be used to control mass spectrometer 72 eliminating the need for separate mass spectrometer control means 74.

Mass spectrometer 72 has a sampling inlet 76 coupled to a sampling conditioning system 78. Sampling conditioning system 78 has inlets 80, 82 coupled to sampling probes 84, 86. Sampling probe 84 is coupled to flue duct 13 upstream of electrostatic precipitator means 14 and downstream of flue gas conditioning means 24 at a point where the sulfur trioxide introduced into flue duct 13 by means 24 has been uniformly mixed with the flue gas in flue duct 13. Sampling probe 86 is coupled to stack 15. Mass spectrometer 72 can illustratively be a Questor® process mass spectrometer manufactured by Extrel, 575 Epsilon Drive, Pittsburgh, Pa. 15238. Sample conditioning system 78 conditions the gas samples input via sampling proves 84, 86 to eliminate all particulate matter from the samples without modifying the chemistry of the gas samples. Sample conditioning system 78 is illustratively a sample conditioning system of the type illustrated in FIG. 1 of C. Bartman, J. Renfore & E. Connolly, *A Mass Spectrometer-Based Continuous Emissions Monitoring System for Hazardous Material Stack Gas Measurements*, presented October, 1990, International Joint Power Generation Conference and Exposition. Sampling probes 84, 86 can illustratively be 302H stainless steel pipes having filters mounted on their inlet ends, such as are disclosed in the above referenced paper. Sampling probes 84, 86 are preferably heated, such as by an electric heat trace, to maintain the temperature of the flue gas samples provided to sample conditioning system 78.

Figure 13:
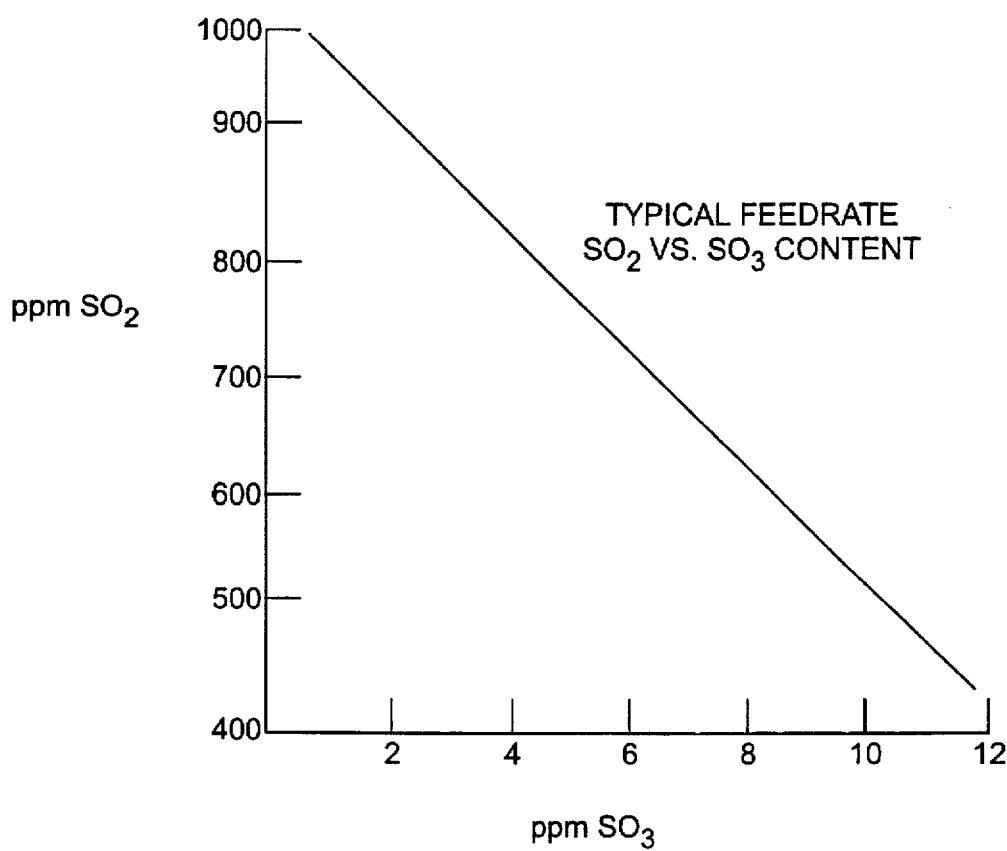
FIG. 13 is a chart showing the relationship between the measured concentration of $SO_2$ in the coal being burned and the desired concentration of $SO_3$ to achieve in the flue gas for optimum conditioning of the flue gas.

Mass spectrometer control means 74 has an input 94 coupled to a data input device 92 by which data indicative of the desired flue gas chemistry is input into mass spectrometer control means 74. Illustratively, data input device 92 is an Elan analyzer which provides on-line analysis of coal to be burned for its sulfur content. The sulfur content of the coal to be burned determined by the Elan analyzer is input to mass spectrometer control means 74 which determines the desired sulfur trioxide concentration range therefrom. Data input device 92 can also be a sulfur dioxide analyzer that periodically samples the sulfur dioxide content of the flue gas leaving the boiler and provides an output characterizing the sulfur content of the coal being burned and the need for particulate matter conditioning agent. In this regard, data input device 92 would have a sampling input coupled to flue duct 13 upstream of means 24. Also, in lieu of data input device 92, a sampling probe 98, shown in dashed lines, coupled to sample conditioning system 78 can be provided in flue duct 13 upstream of means 24. In this case, mass spectrometer 72 measures the sulfur dioxide content of the flue gas leaving the boiler and provides this measurement to mass spectrometer control means 74 which uses it to determine the desired sulfur trioxide concentration range. FIG. 13 is a chart showing the relationship between the $SO_2$ concentration of the coal being burned and the desired $SO_3$ concentration. The $SO_2$ concentration to desired $SO_3$ concentration information reflected in FIG. 13 is illustratively programmed into mass spectrometer control means 74 which uses this information to determine the desired $SO_3$ concentration based on the information about the actual concentration of $SO_2$ input into mass spectrometer control means 74. Data input device 92 could also be a keypad and the desired sulfur trioxide concentration range entered into mass spectrometer control means 74 via the keypad.

Mass spectrometer control means 74 is programmed to cause mass spectrometer 72 to periodically measure the flue gas chemistry of the flue gas provided at its sampling inlet 76 via sampling conditioning system 78 and sampling probes 84, 86 and provide the measurement(s) to mass spectrometer control means 74. Mass spectrometer control means 74 then compares the measured flue gas chemistry, such as sulfur trioxide concentration, with the desired range and provides signals to control means 32 indicating whether the measured flue gas chemistry is in range, too high, or too low. Control means 32 is programmed to periodically sample the rates of sulfur flow as determined by mass flow meter 34. Illustratively, the flue gas chemistry and sulfur flow rates are sampled every few minutes for corrective action. The corrective sampling period or interval t may be varied to suit the system of the electric utility.

Figure 2:
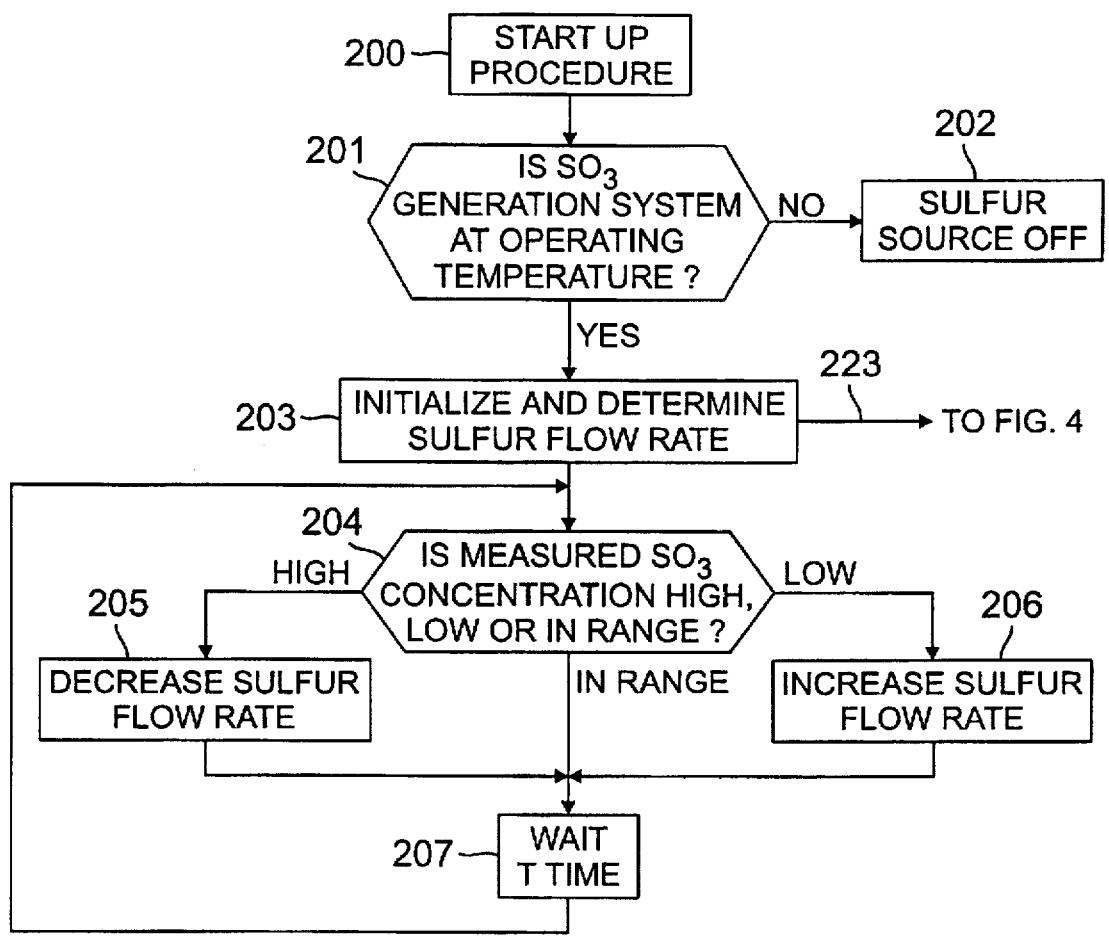
FIG. 2 is a flow chart of one of the programs by which a controller of the invention operates.

A flow chart of the program for controller 32 is set forth on FIG. 2. The program includes a start-up procedure 200 that may be varied, depending upon the system with which it is used. The program also preferably includes a determination that the $SO_3$ generation system 11 has reached and is at a satisfactory operating temperature and, if not, prevents $SO_3$ generation (see steps 201 and 202). If the $SO_3$ generation system is at satisfactory operating temperature, controller 32 determines, as set forth below, an initial sulfur flow rate to the $SO_3$ generation system (step 203) and commences its operation to in conjunction with flue gas measuring means 70 to optimize the sulfur trioxide concentration in flue duct 13.

Controller 32 checks the signals provided by mass spectrometer control means 74 which indicate whether the measured flue gas chemistry, in this case sulfur trioxide concentration, is in the desired range, too high, or too low. If the measured concentration is too high, control means 32 provides a signal to the variable speed drive means for constant displacement pump of means 21, decreasing the rate of flow of sulfur for the next period. In preferred systems of the invention, each corrective sampling period t of controller 32 is at least several minutes and, preferably, on the order of seven to ten minutes. During the following period, sulfur is provided from source 20 for burner 22 at the decreased flow rate and converted to sulfur trioxide and introduced into the boiler flue gas at a corresponding decreased rate by sulfur burner 22 and catalytic converter 23. If the measured concentration is too low, control means 32 provides a signal to the variable speed drive means for constant displacement pump of means 21, increasing the rate of flow of sulfur. During the following period, sulfur is provided from source 20 for burner 22 at the increased flow rate and converted to sulfur trioxide and introduced into the boiler flue gas at a correspondingly increased rate by sulfur burner 22 and catalytic converter 23. If the measured sulfur trioxide concentration is within the desired range, controller 32 leaves the rate Of sulfur flow produced by the variable speed drive pump the same.

After the corrective sampling period t of several minutes, controller 32 again checks the signals provided by mass spectrometer control means 74 which indicate whether the measured sulfur trioxide concentration is within the desired range. If the measured sulfur trioxide concentration is not within the desired range, controller 32 causes variable drive speed pump to increase or decrease the rate of sulfur flow depending on whether the measured concentration is too high or too low, as just discussed. Otherwise, controller 32 causes variable drive speed pump to maintain the rate of sulfur flow at the same level.

During the wait period, mass spectrometer control means 74 has caused mass spectrometer 72 to again determine the concentration of the sulfur trioxide obtained by sampling probe 84. This may occur several times during the wait period or may be timed to occur just before controller 32 checks the signals provided by mass spectrometer control means 74 indicating whether the measured concentration is within range, too high or too low.

Controller 32 may be provided with one or more additional inputs, as shown by a dashed input or inputs 36, to help maintain the concentration of sulfur trioxide in the flue gas within the desired range. Such inputs may be an input from the throttle of the turbine controller to anticipate increases in the demand for conditioning agent.

Controller 32 may also, preferably, be programmed to stop the flow of sulfur from source 20 to sulfur burner 22 in the event that the output of catalytic converter 23 is not within satisfactory temperature limits (e.g., less than 725 degree(s) F. (385 degree(s) C.) or more than 1200 degree(s) F. (649 degree(s) C.)) as shown in step 201 of FIG. 2. As indicated above, the system preferably includes temperature sensor 35 to sense the temperature of the output of the catalytic converter. The signal from temperature sensor 35 provides controller 32 with the information it needs to determine if sulfur trioxide source 11 is at temperatures outside the ranges at which it should be operated. Controller 32 will prevent the operation of means 21 for providing sulfur to sulfur burner 22 until temperature sensor 35 indicates that sulfur burner 22 and catalytic converter 23 have reached satisfactory operating temperatures (e.g., substantially above 725 degree(s) F. (385 degree(s) C.)). As indicated above, sulfur burner 22 and catalytic converter 23 may be preheated by means 16 including air flow source 30 and air flow heater 31. In addition, controller 32 can stop the flow of sulfur to sulfur burner 22 by turning off means 21 to prevent a flow of sulfur to the sulfur burner in the event that the temperature sensed by temperature sensor 35 indicates that sulfur burner 22 and catalytic converter 23 are too hot (e.g., in excess of 1200 degree(s) F. (649 degree(s) C.)) or too cold (below 725 degree(s) F. (385 degree(s) C.)) (steps 201 and 202). Temperatures in excess of 1200 degree(s) F. (649 degree(s) C.) at temperature sensor 35 indicate that the temperature of the catalytic converter is outside of its effective operating range.

While I have indicated that temperature sensor 35 and controller 32 should preferably operate to be sensitive to temperatures under 725 degree(s) F. (385 degree(s) C.) and over 1200 degree(s) F. (649 degree(s) C.), the range of temperatures to which temperature-sensing means 35 should be sensitive may be a narrower range. For example, the minimum temperature at which the system should be operated as sensed by temperature sensor 35 may be 750 degree(s) F. (399 degree(s) C.); and the maximum temperature at which the system should be operated as sensed by temperature sensor 35 may be 1100 degree(s) F. (593 degree(s) C.).

Controller 32 comprises preferably an Allen-Bradley T30 Plant Floor Terminal Programmable Controller or a Bristol-Babcock Network 3000 Compatible Intelligent Controller, but other equivalent programmable controllers can be used. Controller 32 can be provided by a programmable microprocessor and random access memory. Control means 74 can also be such devices and, as discussed previously, can be part of controller 32.

The system of the invention also includes means for maintaining substantially constant heat dissipation within sulfur burner 22. To clarify the description of the system, FIG. 1 illustrates, as separate, a further controller 40 for means 16 to provide a flow of heated air to sulfur trioxide-generating means 11. Controller 40 is, in a preferred embodiment of the system, part of the Allen-Bradley T30 Plant Floor Terminal Programmable Controller, which can perform the function of controller 32 and the function of controller 40 described below. Controller 40 is connected with means 34 to measure the rate at which sulfur is flowing into sulfur burner 22. Since burning sulfur liberates about 4,000 btu's per pound of sulfur burned, controller 40 may be programmed to compute the thermal input to sulfur burner 22 from the sulfur being combusted therein. The rate of heat flow to sulfur burner 22 from the burning sulfur is generally computed by multiplying rate of sulfur flow (Q) to the sulfur burner by the amount of heat (S) generated by the burning sulfur (approximately 4,000 btu's per pound of sulfur). This quantity may be used to reduce the power or heat provided by air flow heater 31 of means 16 to maintain a substantially constant heat dissipation within sulfur burner 22. Controller 40, sulfur burner 22 and means 16 are designed so that, under normal operation, the substantially constant heat input to sulfur burner 22 maintains the temperature within sulfur burner 22 in excess of 750 degree(s) F. (399 degree(s) C.) and, preferably, about between 800 degree(s) F. (427 degree(s) C.) and 850 degree(s) F. (454 degree(s) C.).

Figure 4:
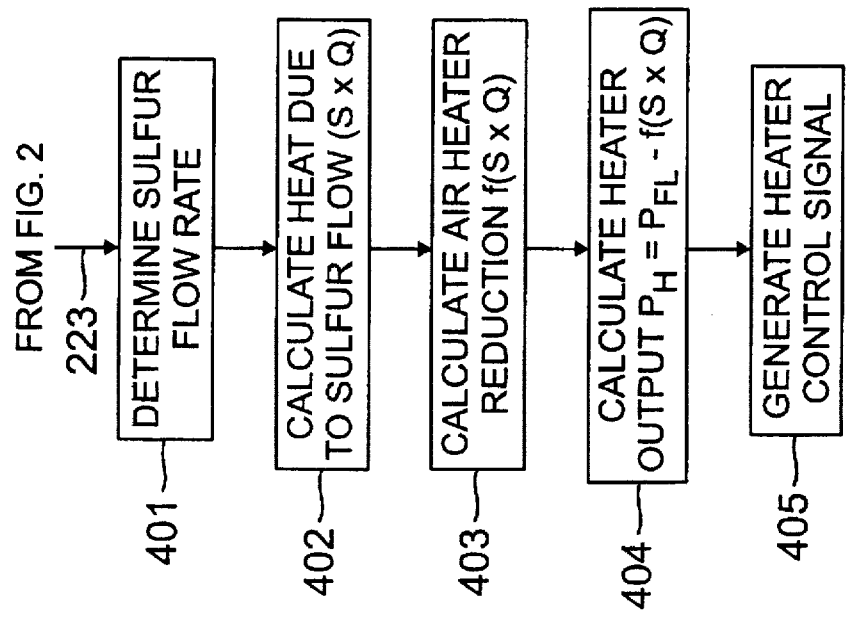
FIG. 4 is a flow chart of another program by which a controller of the invention can operate.

Controller 40 may be a separate controller selected from among many commercially available programmable controllers or microprocessors as apparent to those skilled in the art, but, preferably, is part of the Allen-Bradley or Bristol Babcock controllers identified above, programmed as set forth in FIG. 4.

Figure 3:
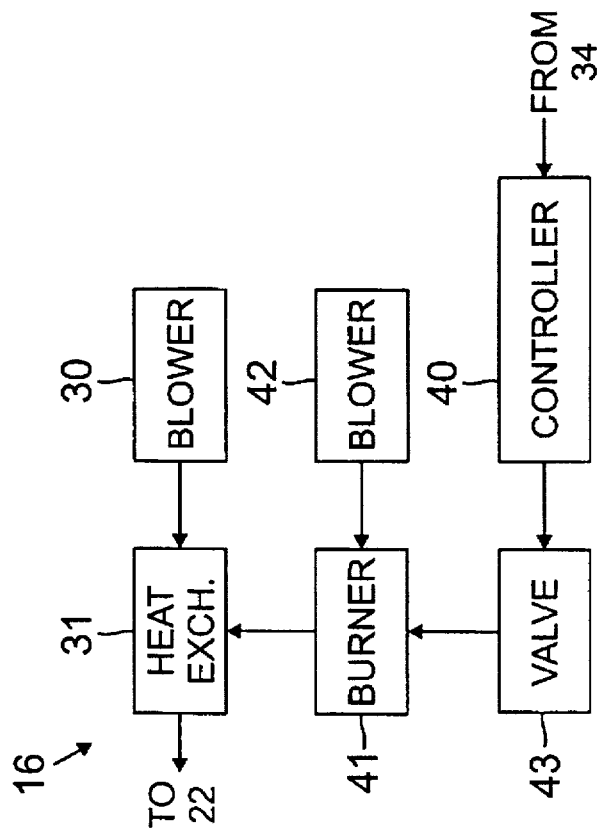
FIG. 3 is a diagrammatic drawing of another embodiment of the means for providing heat to the sulfur trioxide-generating source of the preferred system of FIG. 1.

Heater 31 for the air flow into the sulfur burner may be an electrical heater in which air flow from blower 30 is directed over one or more electrical resistance heating units to bring the output temperature to temperatures of about 900 degree(s) F. (482 degree(s) C.). In the alternative, as shown in FIG. 3, air flow-heating means 31 of means 16 for providing a flow of heated air to the sulfur burner may be a heat exchanger 31 in which hot gas from a fuel oil or gas burner 41 is directed through heat exchange coils over which the air from blower 30 is directed to raise the air flowing outwardly from heater 31 to temperatures in excess of 900 degree(s) F. (482 degree(s) C.). The coils of the heat exchanger may be connected with the output of fuel oil or gas burner 41 which is provided with a burner blower 42 in a manner known in the art and the expended output of the burner may be vented to atmosphere from the heater coils. Such a fuel oil or gas heater system may be preferable in many installations where electrical power may not be conveniently provided for heater 31. Where heater 31 is powered by a gas or fuel oil burner 41, controller 40 controls the flow of fuel oil or gas to burner 41 through a variable flow control valve 43 in accordance with a stored algorithm to provide a constant thermal input to sulfur burner 22.

Controller 40 is thus programmed to receive a signal from mass flow meter 34 and to calculate from the signal from flow meter 34 the rate Q at which sulfur is being directed to sulfur burner 22. Controller 40 can calculate from an algorithm or a data table stored in controller 40 a power reduction for the electrical resistance-heating means within heater 34 in the event electrical heat is used, or controller 40 can calculate a setting for variable flow control valve 43 used to control the fuel oil or gas to a burner 41 from a source of fuel oil or gas in the event that a gas- or fuel-oil-fired heat exchanger is used as heating means 31. Controller 40 thus controls means 16 for providing a heated flow of air to the sulfur burner by the equation: $P_H = P_{FL} - f(Q \times S)$ where $P_H$ is the heat provided by air-heating means 31; $P_{FL}$ is the full-load output of the air-heating means 31; Q is the sulfur flow rate into sulfur burner 22; S is the thermal output of the sulfur fuel provided to sulfur burner 22; and f is a function of $(Q \times S)$ that determines the operation of means 16, particularly the heaters of air-heating means 31 or control valve 43. A flow chart for the program of controller 40 is set forth in FIG. 4.

Figure 5A:
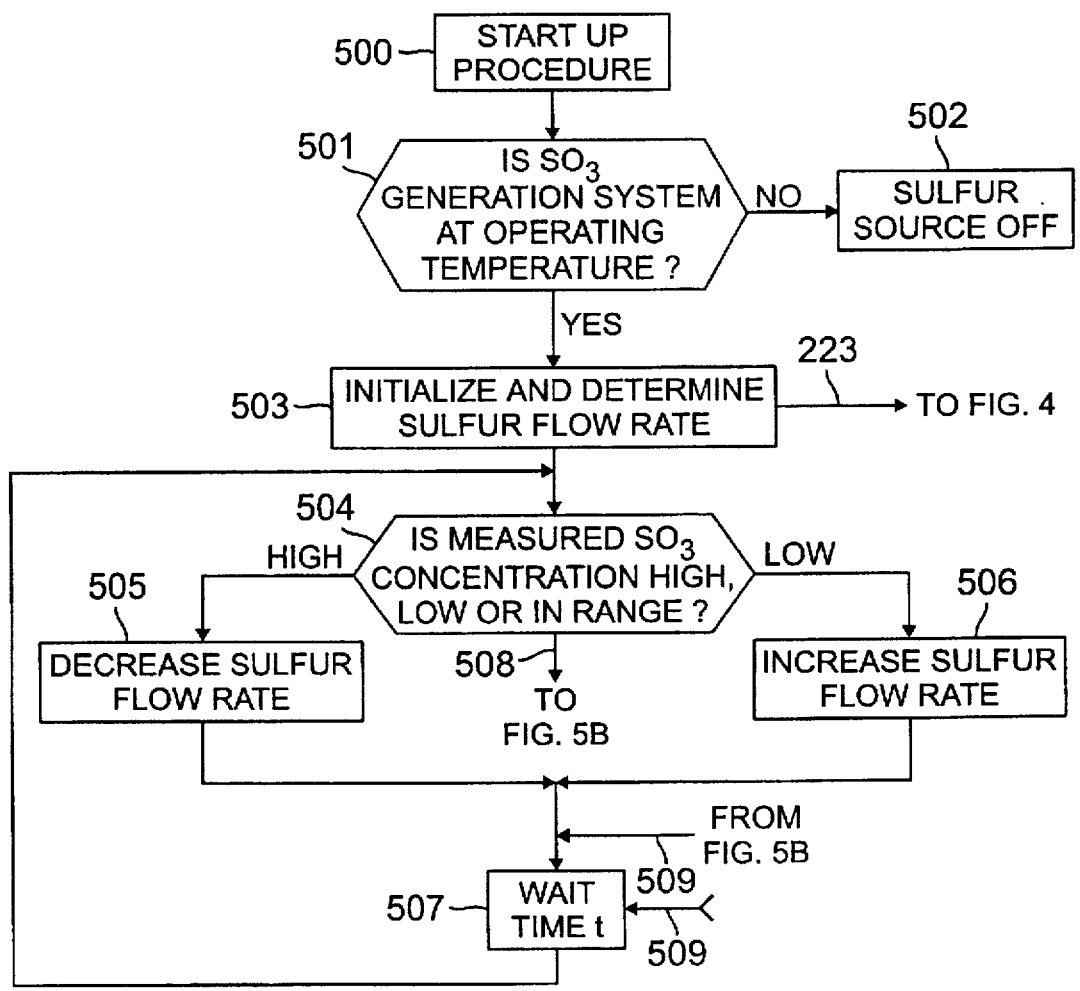
FIGS. 5A and 5B are a flow chart of another program by which a controller of the invention can operate.
Figure 5B:
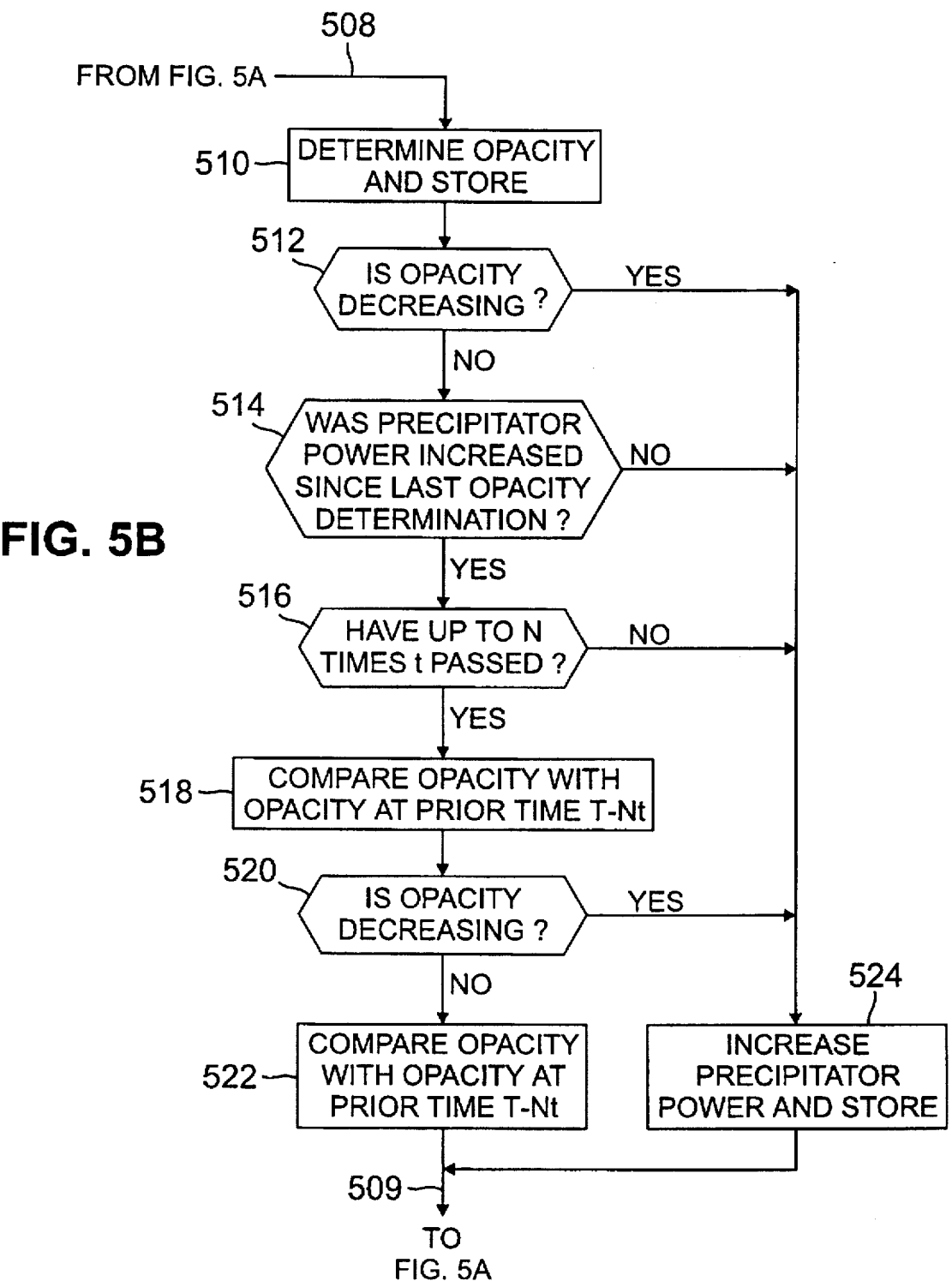

Controller 32 can also control, through the use of the program shown in FIGS. 5A and 5B and one or more additional outputs 37, the electrical power to the electrostatic particle-removal means to operate it at voltage and/or current levels that correspond to minimal opacities of the stack effluent. In this regard, controller 32 is coupled to an opacity meter 33 (FIG. 1) that provides output signals proportional to the opacity of the effluent from the stack 15. To control the power to the electrostatic precipitator means, one or more of inputs 36 of controller 32 can provide controller 32 with a signal or signals indicating the operating conditions of the electrostatic precipitator at each corrective sampling period; and controller 32 can be programmed to increase the voltage and/or current of the electrostatic precipitator until no further improvement in opacity is measured. (Steps 502-514)

Referring to FIGS. 5A and 5B, steps 501 through 507 are identical to steps 201 through 207 of FIG. 2 and thus will not be discussed. When, in step 504, controller 32 determines that the measured concentration of the sulfur trioxide is within the desired range, controller 32 then branches via branch 508 to step 510 (FIG. 5B) where it determines the opacity of the stack effluent from opacity meter 33 and stores it. Controller 32 then checks to see if the opacity of the stack effluent is decreasing. If it is, controller 32 goes to step 524 where it increases the precipitator power, stores the precipitator power level and then returns to step 507 via branch 509. If opacity is not decreasing, controller 32 determines whether precipitator power was increased since the last opacity determination. If it was not, controller 32 goes to step 524 where it increases the precipitator power, stores the precipitator power level and then returns to step 507 via branch 509. If the precipitator power level was increased since the last opacity determination, controller 32 determines whether N corrective sampling periods have passed. If they have not, controller 32 goes to step 524 where it increases the precipitator power, stores the precipitator power level and then returns to step 507 via branch 509. If N corrective sampling periods have passed, controller 32 compares the latest opacity with the opacity determined N sampling periods ago. If the opacity has decreased from the opacity determined N sampling periods ago, controller 32 goes to step 524 where it increases the precipitator power, stores the precipitator power level and then returns to step 507 via branch 509. If the opacity has not decreased from the opacity determined N sampling periods ago, controller 32 selects the optimum precipitator power level from the precipitator power levels stored in its memory, sets the precipitator power to that level, and returns to step 507 via branch 509. The optimum power level is the lowest precipitator power level at which the minimum opacity is achieved. Controller 32 selects this optimum power level by finding the lowest precipitator power level stored in its memory which corresponds to the minimum opacity level stored in its memory.

Figure 6:
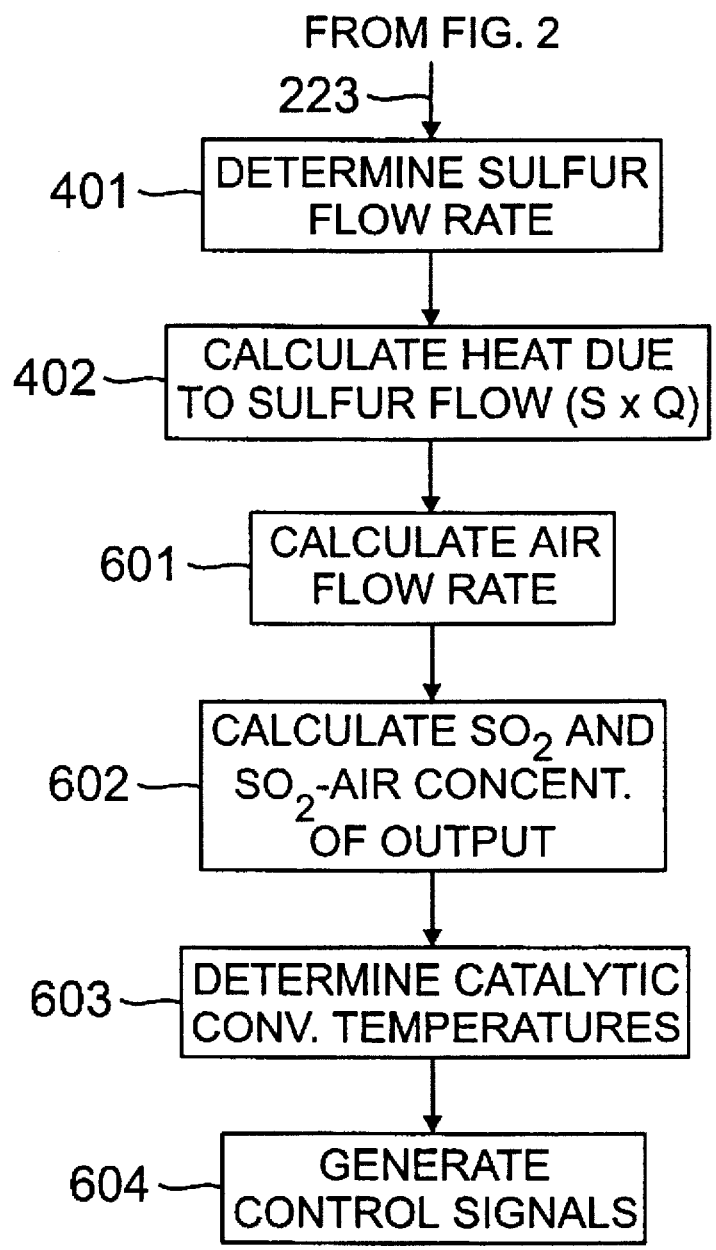
FIG. 6 is a diagrammatic drawing of another system of the invention.
Figure 7:
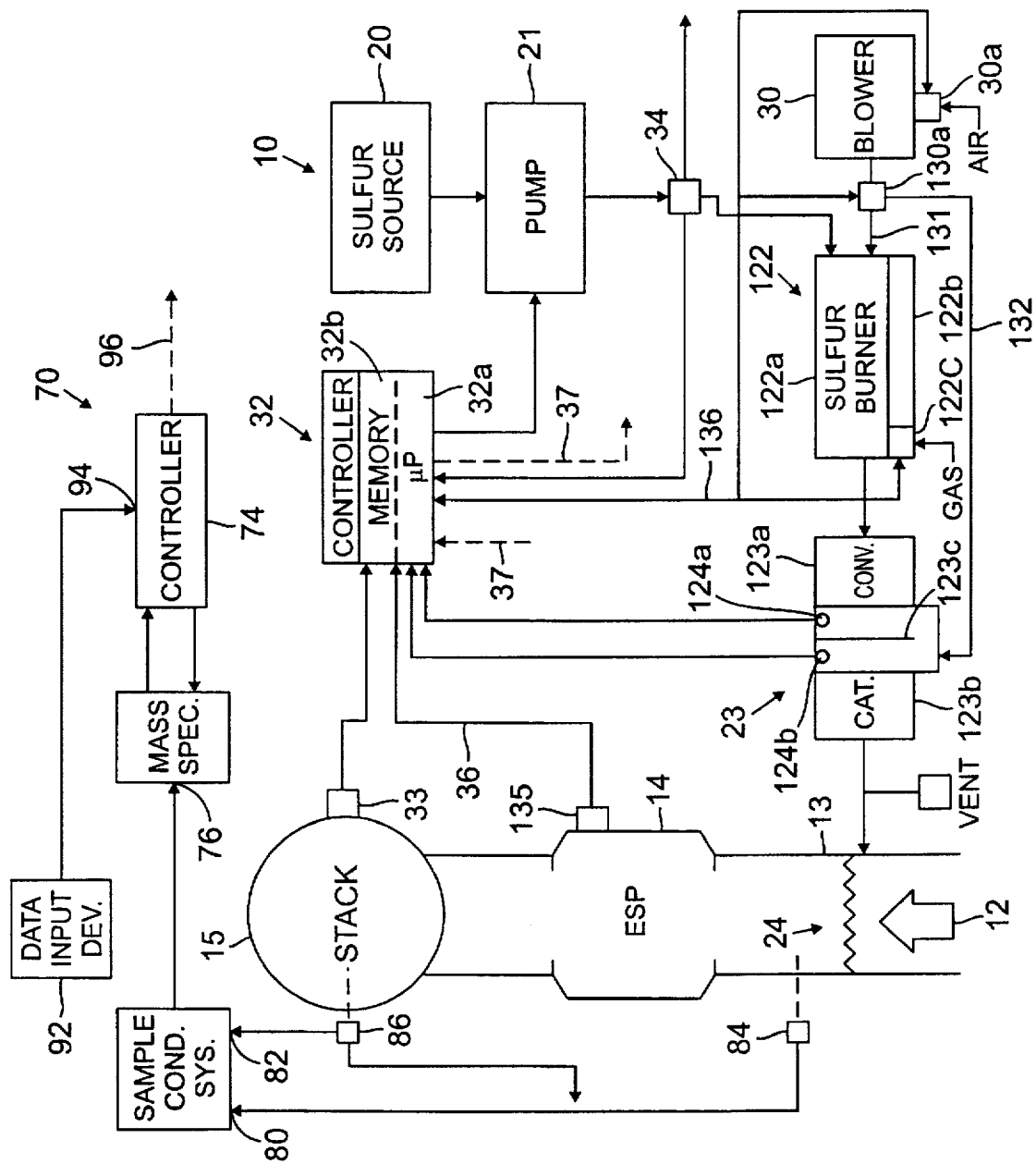
FIG. 7 is also a diagrammatic drawing of another system of the invention.

FIGS. 6 and 7 show another preferred $SO_3$ conditioning system. The system of FIG. 7 differs from the system of FIG. 1 in several regards. The air flow means or blower 30 includes a controllable air valve 30a at its inlet operated by controller 32 with the program of the flow chart of FIG. 6 as described below. The sulfur burner 122 includes a sulfur burner portion 122a, a gas-fired heater potion 122b and a controllable valve 122c operated by the controller 32 with the program of the flow chart of FIG. 6, as described below. The catalytic converter 123 includes a first stage 123a and a second stage 123b whose operating temperatures are independently controllable and can be operated with the program of FIG. 6 as described below. The first catalytic conversion stage is preferably, thermally isolated from the second catalytic conversion stage. As shown in FIG. 7, a temperature sensor 124a is located to sense and provide controller 32 with the temperature at the output of the first stage 123a of the catalytic converter, and a temperature sensor 124b is located to sense and provide controller 32 with the temperature at the input to the second stage 123b of the catalytic converter. The catalytic converter 123 is provided with means 123c to direct the flow from the first stage 123a to the second stage 123b so that the input temperature of the second stage 123b may be controlled. The output of the air blower 30 is connected to a variable flow divider 130a, which directs a potion of the air flow output of blower 30 into the sulfur burner portion 122a through conduit 131 and directs the remainder of the air flow output of blower 30 through a conduit 132 for injection between the first and second stages of the catalytic converter as shown in FIG. 7. As shown in FIG. 7, the flow divider 130a is connected with controller 32 by connection 137a and is operated by the controller 32 with the program shown in the flow chart of FIG. 6, as described below.

The system of FIG. 7 is also provided with means 135 to determine the power used by the electrostatic precipitator 14 in removing particulate matter from the flue gas. The means 135 may be one or more resistors connected between ground and the high voltage output potions of the high voltage power supplies delivering power to the sections of the electrostatic precipitator 14 to sense the current provided by the one or more high voltage supplies, or the means 135 may be a current or power measuring means in the low voltage input side of the high voltage power supplies delivering power to the electrostatic precipitator 14. The signal from power determining means 135 may be used by controller 32 in the program shown by the flow chart of FIG. 5 and described above to sense the precipitator power level.

In the system of FIGS. 6 and 7, controller 32 operates fuel valve 122c to control the heater portion 122b of the sulfur burner, the air valve 30a to control the quantity of air introduced to the system and the air divider 130a to control the quantity of unheated air introduced between the first stage 123a and second stage 123b of the catalytic converter 123. With the program of FIG. 6, controller 32 determines the sulfur flow rate from flow meter 34 (step 401), and determines the air flow rate from flow divider 130a (step 601). Controller 32 calculates, from the sulfur flow rate and air flow rate, the rate of sulfur dioxide generation and the sulfur dioxide-air concentration of the sulfur burner output (step 602). Controller 32 determines the catalytic converter temperatures of the output of the first stage 123a from temperature sensor 124a and of input of the second stage 123b from temperature sensor 124b (step 603) and generates control signals for the fuel valve 122c, air inlet valve 30a and air divider 130a as described below (step 604). Controller 32 provides a variable set point for the output temperature of the first stage 123a of catalytic converter 123 and controls the valve 122c to increase or decrease the heat introduced into the sulfur burner 122 to maintain the temperature at sensor 124a and the output of the first stage 123a of the catalytic converter 123 at the variable set point, which varies proportionally and uniformly from 850 degree(s) F. (455 degree(s) C.) for a one percent (1%) concentration of $SO_3$ in air to 1050 degree(s) F. (565 degree(s) C.) for a four percent (4%) concentration of $SO_3$ in air. Controller 32 also controls air inlet valve 30a and air flow divider 130a to increase or decrease the air introduced into the system through air inlet valve 30a and diverted into conduit 132 by air divider 130a for introduction between the first stage 123a and second stage 123b of catalytic converter 123 to maintain the temperature at sensor 124b and the input of the second stage 123b at a most desirable temperature, for example 790 degree(s) F. (420 degree(s) C.), for conversion of the sulfur dioxide remaining after the first stage conversion into sulfur trioxide in the second stage. Preferably, controller 32 operates air flow divider 130a to maintain a substantially constant flow of air through sulfur burner 122.

The system of FIGS. 6 and 7 is well suited to efficiently convert a wide range of sulfur dioxide-air concentrations into sulfur trioxide. In systems that require only a narrow range of low concentrations of sulfur dioxide and air, it may be desirable to omit the variable air inlet valve 30a and variable air divider 130a and provide a fixed flow of unheated air through conduit 132 for introduction between the first stage 123a and second stage 123b of catalytic converter 123b, or no such air at all, and to control only the fuel valve 122c to increase and decrease the heating of sulfur burner 122 to maintain the temperature at the input of the second stage 123b of the catalytic converter for efficient and effective conversion of SO sub 2 into $SO_3$ by the catalytic converter 123.

The system can be provided with, for example, data entry means such as a keyboard, card reader, magnetic disc-operating system and other such means to provide controller 32 with data for operation and to permit changes in the programmed steps, the corrective sampling period, waiting time intervals and the like. For example, controller 32 may be provided with data on the opacity required to meet clean air standards and regulations. The system may also be provided, of course, with a supplementary control to prevent manual operation of the flue gas-conditioning system.

Upon startup of the system of the invention of FIGS. 1–5, the operator can push a "START" button, activating means 16 including blower means 30 and heating means 31 for providing a flow of heated air to sulfur burner 22 and catalytic converter 23 of sulfur trioxide-generating means 11. As indicated above, the air flow from heater means 31 can be on the order of 900 degree(s) F. (482 degree(s) C.) and have sufficient volume to bring the temperature of sulfur burner 22 and catalytic converter 23 into an operating range within a short period. When temperature sensor 35 indicates the gas exiting catalytic converter 23 is in excess of 725 degree(s) F. (385 degree(s) C.), for example, sensor 35 provides a signal to controller 32 which activates the electric drives for the pumps of means 21 and begins to deliver sulfur at a controlled rate from source 20 to sulfur furnace 22. Controller 40, upon receiving a signal that sulfur is being directed into sulfur burner 22, reduces the power for the electrical heaters of heater 31, or reduces the flow of fuel oil or gas to burner 41 (FIG. 3), to maintain a substantially constant thermal input to sulfur burner 22 to maintain the temperature within sulfur burner 22 within a satisfactory operating range. The system is designed so that when the temperature at the output of catalytic converter 23 exceeds 725 degree(s) F. (385 degree(s) C.), the temperatures within the sulfur burner 22 and catalytic converter 23 are in excess of 750 degree(s) F. (399 degree(s)C.) and within the temperature range for the effective conversion of sulfur to sulfur trioxide. The rate at which sulfur is introduced into sulfur burner 22 by controller 32 upon startup may be set manually by the operator; or the memory 32b of controller 32 may be non-volatile and controller 32 may be provided with a startup algorithm to gradually increase the rate of sulfur flow to the preferred sulfur flow rate last stored in its memory before it begins controlling the concentration of sulfur trioxide in the flue gas as discussed above.

As set forth above, the functions of controllers 32 and 40 are preferably combined in a single controller and mass spectrometer control means 74 may also be incorporated with controllers 32 and 40 in a single controller; and controllers 32, 40 and 74 of the system of FIG. 1 may, of course, be connected with computer systems used by the electrical utility through additional inputs 36 and outputs 37, 96 to provide, to such computer systems, data from the operation of the system of FIG. 1 to provide a history of operation of the system and to permit the operators and their computers to generate their own operating data and override or change the automatic operation of the system, if desired. Furthermore, the controllers of FIG. 1 can provide additional outputs 37 to operate digital indicators to indicate to control room personnel current operating conditions. In addition, the system, through the use of its transient condition signals, may operate annunciators and indicators for control room personnel of the electrical utility, indicating, for example, non-compliance with clean air regulations and the detection of transient conditions that affect stack effluent and air pollution. As will be apparent to those skilled in the art, controllers 32, 40 and 74 and the variable speed controllers for means 21 may be conveniently housed in a single control enclosure adapted and located to protect the controllers from the surrounding environment.

The sulfur-burning systems of the invention described above are preferred because of economy of operation and their improved capability for being operated safely as a source of sulfur trioxide. The invention, however, can be incorporated into systems using other sources of conditioning agent and other sources of sulfur trioxide.

Figure 8:
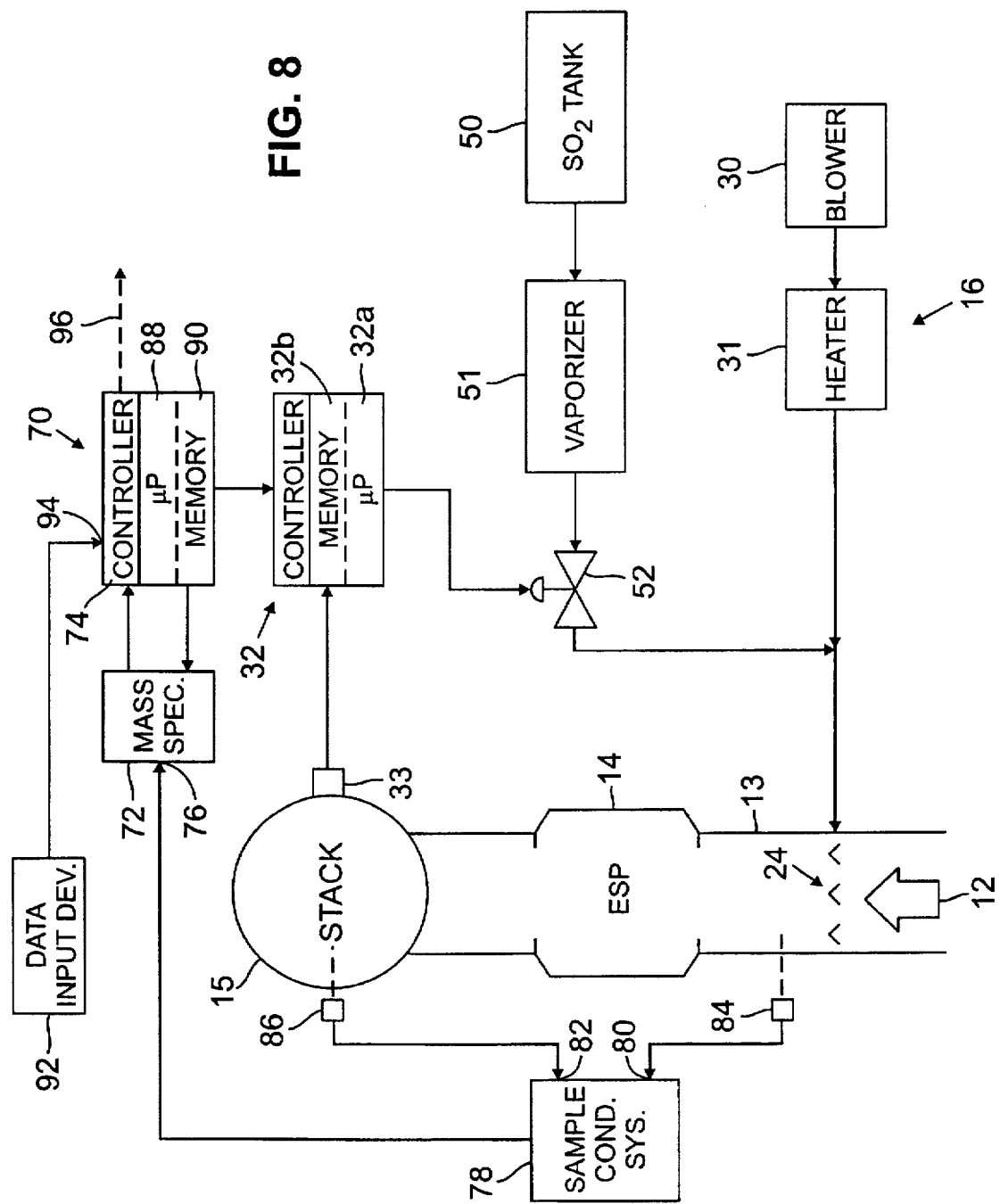
FIG. 8 is also a diagrammatic drawing of another system of the invention.

FIG. 8 shows a system for providing a controlled flow of sulfur trioxide for conditioning a boiler flue gas to obtain and maintain the concentration of the sulfur trioxide in the flue gas within a desired range. The system of FIG. 8 includes, as a source of sulfur trioxide-conditioning agent, a storage tank 50 for liquid sulfur trioxide, a vaporizer 51 to convert the sulfur trioxide from liquid to gaseous form and a control valve 52 operated by controller 32 to vary the sulfur trioxide flow rate, as described above, to obtain and maintain the desired concentration of sulfur trioxide in flue duct 13. The system of FIG. 8 also includes a source of heated air 16 to maintain the sulfur trioxide gas in gaseous form downstream of control valve 52 to prevent corrosion due to condensation of the sulfur trioxide in the system. Controller 32 and flue gas chemistry measuring means 70 operate in the same manner as described above with respect to FIGS. 1, 2 and 5 to obtain and maintain the desired concentration of sulfur trioxide in flue duct 13 and the source of heated air 16 is substantially the same as described above. The FIG. 8 system may be provided with a shut-off and control valve for the liquid sulfur trioxide, a damper, or air flow control, for the heated air and other control valves and gauges necessary and convenient to its operation and maintenance.

Figure 9:
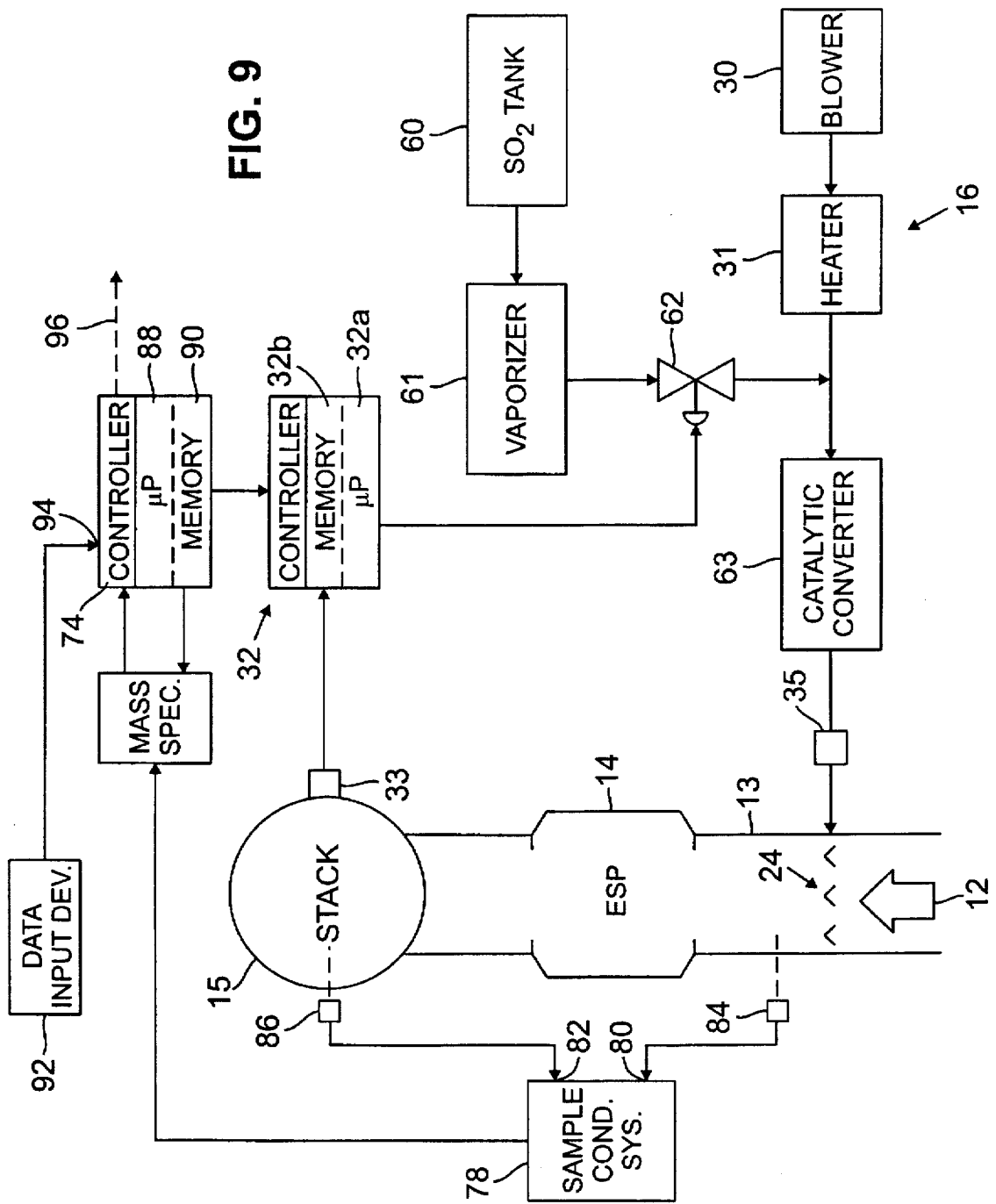
FIG. 9 is also a diagrammatic drawing of another system of this invention.

FIG. 9 shows another system for providing a controlled flow of sulfur trioxide to obtain and maintain a desired concentration of sulfur trioxide in the boiler flue gas in flue duct 13. As shown in FIG. 9, the source of sulfur trioxide conditioning agent includes a storage tank 60 for liquid sulfur dioxide, a vaporizer 61 to convert the sulfur dioxide from a liquid to a gaseous state, a catalytic converter 63 to convert sulfur dioxide into sulfur trioxide and a control valve 62 operated by controller 32 to vary the sulfur dioxide flow rate to catalytic converter 63 as described above and to, accordingly, vary the sulfur trioxide flow rate to obtain and maintain a desired concentration of sulfur trioxide in the flue gas in flue duct 13. The system of FIG. 9 also includes a source of heated air 16 to bring catalytic converter 63 up to and maintain catalytic converter 63 at its preferred operating temperatures, e.g., 800 degree(s) F. to 850 degree(s) F. (427 degree(s) C. to 454 degree(s) C. Such temperatures are above the temperature at which sulfur trioxide condenses within the system. Controller 32 and flue gas chemistry measuring means 74 operate in the same manner as described above with respect to FIGS. 1, 2 and 5 to obtain and maintain minimal opacity of the stack effluent and the source of heated air 16 is substantially the same as described above. Of course, the FIG. 9 system may be provided control valves and gauges necessary and convenient to its operation and maintenance.

Figure 10:
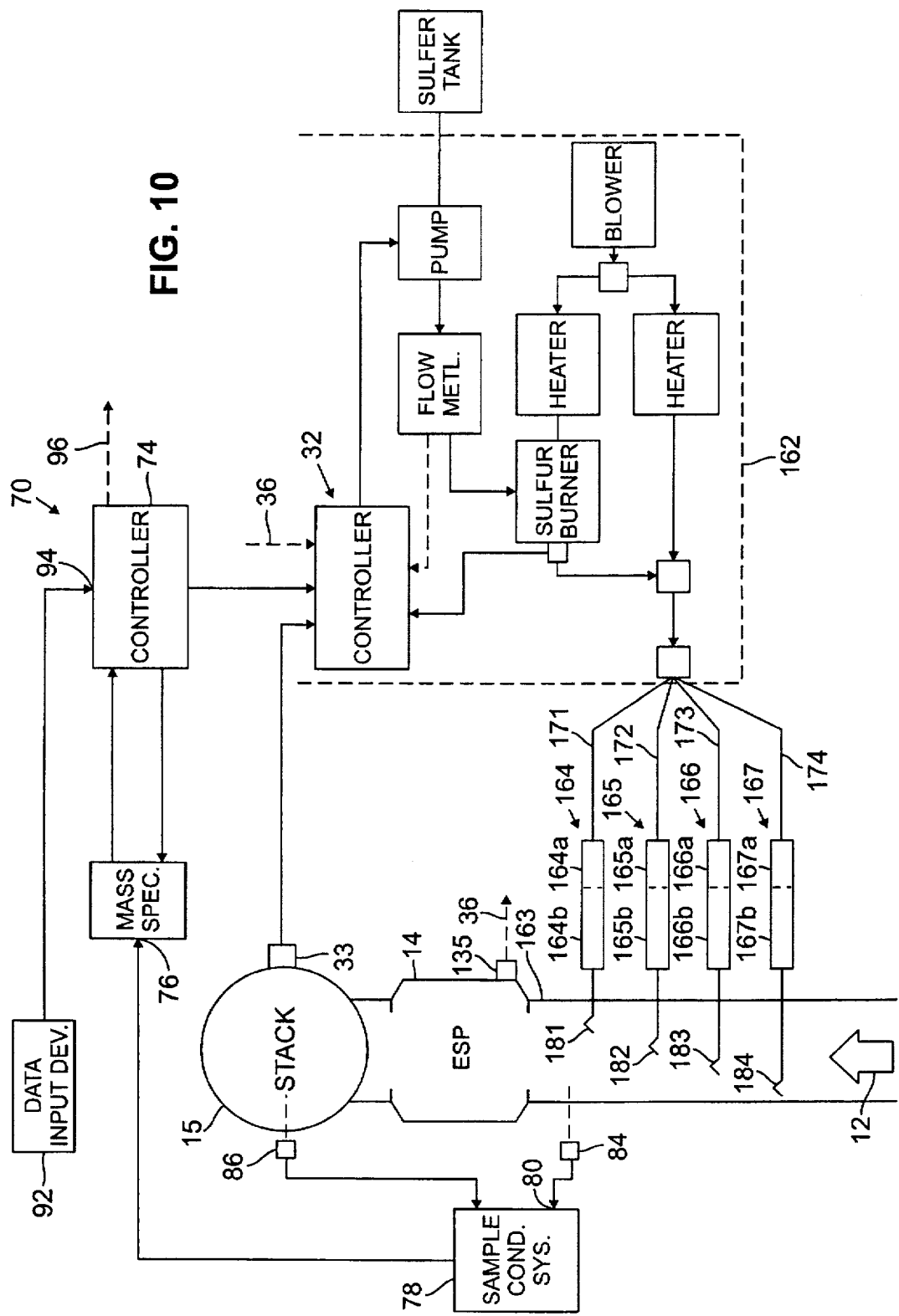
FIG. 10 is a diagrammatic drawing of still another system of this invention.

FIG. 10 shows still another system of the invention. The new system shown in FIG. 10 includes a source of liquefied sulfur 150 which may include a concrete storage pit or a thermally insulated tank that is provided with heating elements to liquefy the sulfur. In the system, liquefied sulfur will be pumped by a metering pump 151 from the sulfur source 150 through steam-jacketed and thermally insulated pipes 150a–150e and a mass flow meter 152 (which is optional) to a sulfur burner, or furnace, 153 for combustion. The sulfur burner 153 can be a conventional sulfur furnace construction with a refractory lining and a brick checker work. Preferably, the sulfur burner of the system can be a spray burner in which the liquefied sulfur is sprayed into the refractory furnace from one or more spray nozzles. Such spray burner systems provide more vigorous burning and more complete combustion than the conventional checkerwork furnaces, and the spray burner apparatus is smaller, less expensive and more easily controlled, and permits the burning of sulfur to be terminated quickly if necessary. The products of combustion of the sulfur, primarily sulfur dioxide, will be directed from the sulfur burner 153 through conduit 153a and mixed with air from conduit 157a, as described below.

The system shown in FIG. 10 includes a constant volume blower 154. The constant volume blower 154 provides a flow of air to a flow divider 155 which divides the air flow between two conduits 155a and 155b to air heaters 156 and 157. The air flow from blower 155 through conduit 155a is raised in temperature by air heater 156 to a constant temperature of 750 degree(s) F. at the heater output and is directed into the sulfur burner 153 to raise the sulfur burner 153 to a temperature sufficient to burn sulfur, that is, approximately 750 degree(s) F. A temperature sensor 158 at the output of the sulfur burner 153 is set to provide an operating signal to controller 32 when the temperature at the output of the sulfur burner exceeds 600 degree(s) F. When controller 32 receives the signal from temperature sensor 158 indicating the air leaving the sulfur burner 153 exceeds 600 degree(s) F., the controller 32 will be enabled to operate sulfur pump 151, as described above, to operate the system at minimal opacities and minimal sulfur flow rates. During operation of the system, controller 32 operates sulfur pump 151 to deliver liquefied sulfur from sulfur source 150 through a flow meter 152 (which is optional) to sulfur burner 153. In sulfur burner 153, the sulfur is mixed with the air from air heater 156 and combusted to create combustion products, primarily SO sub 2, which are directed from the output of the sulfur burner 153 through conduit 153a.

The system of FIG. 10 requires no control of the temperature or of the volume of air introduced into sulfur burner 153 by blower 155 and air heater 156. Under all conditions of operation of controller 32 and sulfur burner 153, a constant flow of air at an effective burner input temperature of 750 degree(s) F. can be introduced into sulfur burner 153. The air from blower 154 is split into conduits 155a and 155b in a constant proportion. The flow rate of air introduced into conduit 155a, air heater 156 and sulfur burner 153 is only that flow rate sufficient to burn sulfur and may typically be as low as 40 to 50 standard cubic feet per minute, which substantially reduces the power requirements for air heater 156. Blower 154 and divider 155 deliver a larger volume rate of the air into conduit 155b and heater 157, for example, about 850 standard cubic feet per minute, to mix with and dilute the sulfur dioxide leaving burner 153. Air heater 157 raises the temperature of this larger proportion of air slightly, to about 100 degree(s) F., a temperature sufficient to maintain the sulfur dioxide and air combination above the condensation temperature of sulfurous acid after mixing. The second flow of heated air is delivered through conduit 157a to a mixing junction 159 where it is mixed with the sulfur dioxide leaving sulfur burner 153 through conduit 153a. The combined air-sulfur dioxide mixture will then travel through conduit 160 to a flow divider 161.

Thus, the air from blower 154 is split between conduits 155a and 155b, with the air flow through air heater 156 and sulfur burner 153 being only five to ten percent of the air flow and with the remaining ninety to ninety-five percent of the air flow being directed through conduit 155b and air heater 157. This proportion will provide, upon mixing of the $SO_2$ from conduit 153a and the slightly heated air from conduit 157a, an air-$SO_2$ concentration suitable for conversion to sulfur trioxide.

In this preferred embodiment of the invention, the sulfur pump 151, flow meter 152, sulfur burner 153, blower 154, flow divider 155, air heater 156, air heater 157, conduits 150b, 150c, 153a, 155a, 155b and 157a, mixing junction 159 and flow divider 160 may be supported and carried by a single supporting structure or means, which is indicated at 162, and can all be integrated into a single assembly which may be located remotely from the duct work 163 for the flue gas. The integrated assembly can also include an insulated and heated tank (as sulfur source 150) which is supported and carried with conduit 150a by the supporting structure 162. Such an integrated assembly may be conveniently built and tested at a production facility located distantly from the site of its installation and may be shipped as a unit for installation. In this preferred system, the temperature of the air-$SO_2$ mixture downstream of the mixing junction 159 need only be maintained in excess of the relatively low temperature at which the air-SO sub 2 mixture will condense to form sulfurous acid (about 180 degree(s) F.). Conduit 160 for the air-$SO_2$ mixture may be mild steel pipe with sufficient thermal insulation to insure that the temperature of the air-$SO_2$ mixture remains above 180 degree(s) F.

The system of FIG. 10 includes a plurality of sulfur dioxide conversion means, 164–167, preferably one for each $SO_3$ insertion site in conduit 163. The air-SO sub 2 mixture is divided by a flow divider 160 into a plurality of conduits, 171–174, for delivery to the location adjacent the plurality of sulfur dioxide conversion means, 164–167, where it is heated to 800 degree(s) F., converted to $SO_3$, and delivered to a plurality of $SO_3$ insertion devices 181–184. Each of the plurality of sulfur dioxide conversion means 164–167 includes a small heater, 164a–167a, respectively, and a small catalytic converter 164b–167b, to convert sulfur dioxide into sulfur trioxide immediately adjacent the plurality of insertion probes 181–184. The air-$SO_2$ mixture in each of conduits 171–174 is directed into the small heaters 164a–167a, which includes self-contained temperature regulators to raise the output temperature of the air-$SO_2$ mixture to 800 degree(s) F., prior to its entry into the plurality of catalytic converters 164b–167b where the $SO_2$ is converted to $SO_3$ and immediately injected into duct work 163 through the injection devices 181–184.

The sulfur trioxide is mixed with the boiler flue gas and its entrained particulate matter to condition the particulate matter for removal by the electrostatic precipitator 14. The electrostatic precipitator is operated to remove particulate matter from the boiler flue gas before it is emitted into atmosphere from the stack 13. Controller 32 and flue gas chemistry measuring means 74 operate in the same manner as discussed above with respect to the embodiment shown in FIG. 1 to obtain and maintain a desired sulfur trioxide concentration in the flue gas in flue duct 13.

The invention thus provides an integrated assembly adapted for providing a flow of air and sulfur dioxide at a temperature in excess of the condensation temperature of sulfurous acid. The integrated assembly includes first means for providing a flow of sulfur dioxide, second means for providing a flow of heated air, third means for mixing the flows of sulfur dioxide and heated air to produce a combined flow of sulfur dioxide and air at a temperature in excess of the condensation temperature of sulfurous acid and for dividing the flow of sulfur dioxide and air into a plurality of flows for conversion to sulfur trioxide and injection into the boiler flue gas at a plurality of injection sites upstream of the electrostatic precipitator, and fourth means for supporting and carrying said first, second and third means as an integrated assembly. In a preferred integrated assembly of such apparatus, the first means comprises a sulfur pump, a sulfur burner having a sulfur input and air input and a sulfur dioxide output, and an insulated conduit interconnecting the sulfur pump and the sulfur input of the sulfur burner, an air blower and air flow divider connected with the air blower and having a first output and a second output, a first heater, a first air conduit means interconnecting the first output of the air divider and first heater with the air input of the sulfur burner. The second means comprises a second heater, a second air conduit means interconnecting the second output of the air divider and second heater with the sulfur dioxide output of the sulfur burner. In some installations, the first means can include the sulfur source and insulated conduits leading to the sulfur pump. In the embodiment described, one or more sulfur dioxide conversion means, such as the two-stage catalytic converters 123 shown in FIG. 10, may be located remotely from the integrated assembly adjacent the injection sites and away from work areas.

Further, a plurality of relatively compact sulfur dioxide conversion means can be adapted for support and location remote from the integrated assembly at injection sites for sulfur trioxide upstream of the electrostatic precipitator. Each such sulfur dioxide conversion means comprises a heater and a catalytic converter adapted for connection with one of the plurality of flows of sulfur dioxide and air, and the heaters and catalytic converters have a physical size and a heating and conversion capacity permitting their close location to one of the injection sites for sulfur trioxide.

Figure 11:
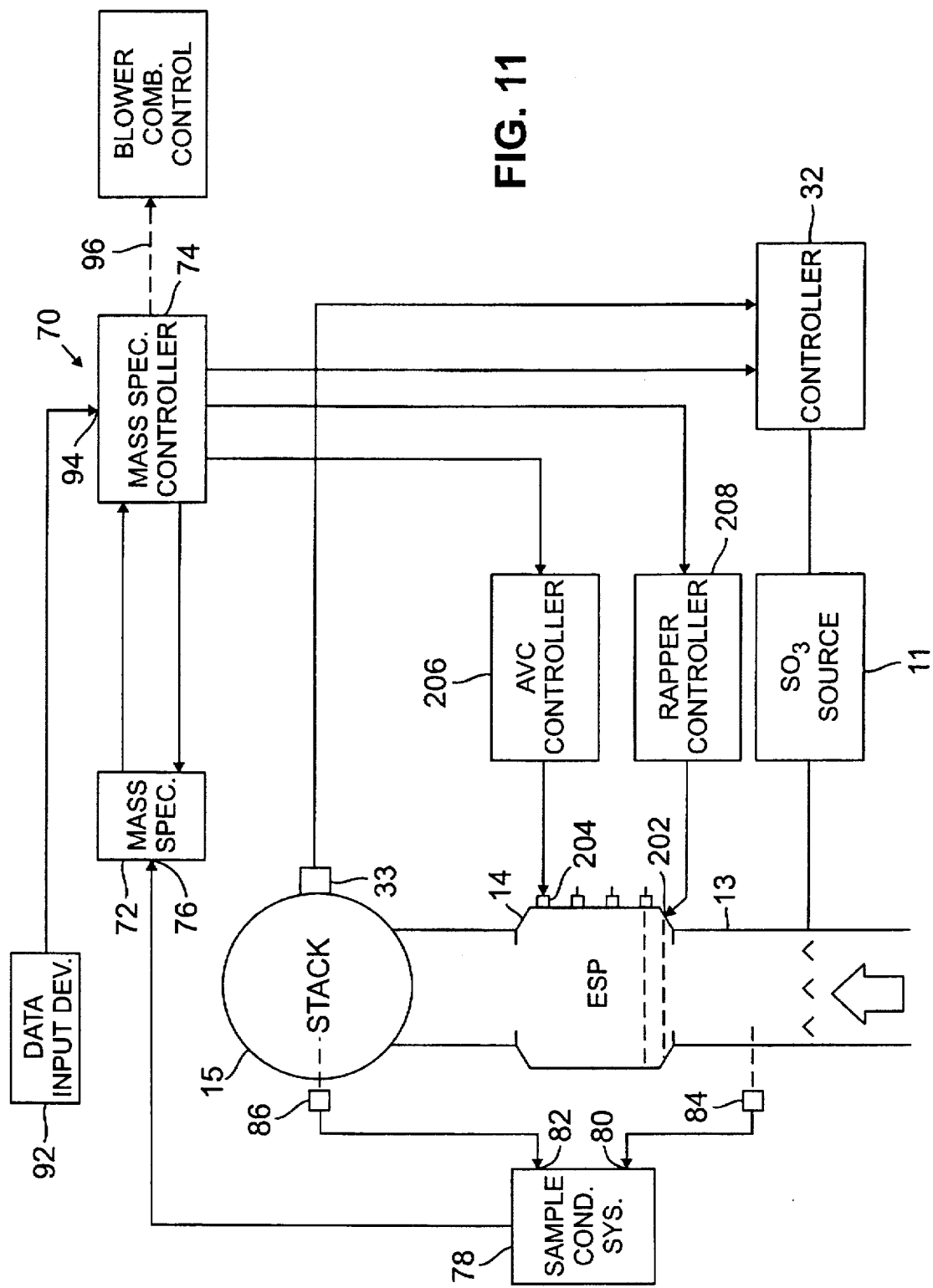
FIG. 11 is a diagrammatic drawing of still another system of this invention.

Measured flue gas chemistry can also be used to control the automatic voltage controls of electrostatic precipitators, rapper systems of electrostatic precipitators, and/or boiler combustion. FIG. 11 shows such a system. Elements that are common to the embodiment of FIG. 11 and the embodiment shown in FIG. 1 are identified with the same reference numbers. The system of FIG. 11 generates control signals for the electrostatic precipitator means 14 automatic voltage control and the rapper control for the rapper of the electrostatic precipitator based on flue gas chemistry measured with mass spectrometer 72. The system of FIG. 11 also provides control information to the boiler combustion control related to the concentrations of carbon monoxide, carbon dioxide, oxygen, nitrogen, nitrous oxide and hydrogen which the boiler combustion control uses to determine exact stoichmetric combustion rates which leads to faster and more accurate control of boiler combustion.

In coal fired boilers, the chemistry of the blend of the coal to be burned can be pre-qualified, e.g., the ratio of high to low sulfur coal can be determined. The stoichmetric ratio of the required molecular weight of oxygen for maximum theoretical conversion of coal or carbon to energy through oxidation or burning can be expressed by the equation:

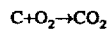

Thus, by the molecular ratio of oxygen to carbon, 2.67 (32/12), one pound of carbon plus 2.67 pounds of oxygen will yield 3.67 pounds of carbon dioxide (ignoring hydrogen formed by high temperature disassociation of $H_2O$).

Ideally, a boiler should be operated to achieve the above relationship. That is, the boiler should be operated to achieve one-hundred percent combustion of the coal being burned using the minimum necessary combustion air flow. However, since the instrumentation used in heretofore known boiler combustion control systems cannot precisely determine the exact stoichmetric ratios needed so that only the minimum necessary combustion air flow is provided, boiler systems are typically operated with combustion air flows of about 105% to 110% of the minimum required combustion air flow. Since two or more large fans driven by motors on the order of twenty thousand horsepower are used to provide the combustion air flow, it can be seen that operating at combustion air flows above the minimum requires the use of significant additional power.

Figure 12:
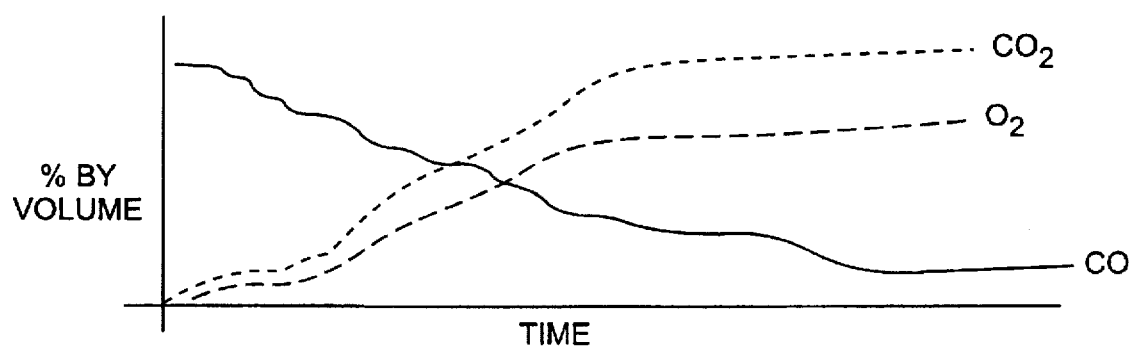
FIG. 12 is a chart showing the ideal stoichmetric relationship of carbon monoxide, carbon dioxide and oxygen for one-hundred percent combustion of coal over time.

FIG. 12 is a chart showing the ideal stoichmetric relationship of carbon monoxide, carbon dioxide and oxygen over time for a boiler. A mass spectrometer can, by measuring the concentrations of carbon monoxide, carbon dioxide and oxygen, plot a comparable chart of the actual stoichmetric relationships of the concentrations of these compounds. Using (lambda) to represent the ratio of actual $O_2$ used for combustion to the theoretical $O_2$ required for one-hundred percent combustion, (lambda) can be determined from the actual stoichmetric relationships of carbon monoxide, carbon dioxide and oxygen as determined by a mass spectrometer. Once (lambda) is determined, it is compared to the ideal of 1.0 and the flow of combustion air increased or decreased accordingly to bring lambda as close to 1.0 as possible.

The system of FIG. 11 is a system for optimizing (lambda) as well as controlling the automatic voltage control of the electrostatic precipitator and the rapper control based on flue gas chemistry. Referring to FIG. 11, the electrostatic precipitator means 14 has a rapper 202 (shown in dashed lines) and transformer rectifiers such as transformer rectifier 204. As is known, electrostatic precipitators typically have multiple transformer rectifiers. Since the transformer rectifiers are identical and controlled identically, only transformer rectifier 204 is discussed herein as representative of the transformer rectifiers of the electrostatic precipitator means 14. Transformer rectifier 204 is coupled to an automatic voltage controller 206. Automatic voltage controller 206 is coupled to mass spectrometer controller 74. Rapper 202 is coupled to a rapper controller 208 which is coupled to mass spectrometer controller 74.

While presently preferred embodiments and other less preferred embodiments of the invention are described above, those skilled in the art will recognize that other embodiments are possible without departing from the scope of the following claims.

What is claimed is:

1. A method of conditioning a boiler flue gas for removal of entrained particulate matter by an electrostatic precipitator, comprising the steps of:
   a. providing a flow of conditioning agent at a controlled rate;
   b. mixing the conditioning agent with a flow of boiler flue gas to condition the flue gas;
   c. directing the boiler flue gas mixed with the conditioning agent through an electrostatic precipitator;
   d. periodically measuring the concentration of the conditioning agent in the boiler flue gas with a mass spectrometer;
   e. comparing the measured concentration of the conditioning agent to a desired concentration range; and
   f. adjusting the controlled flow of conditioning agent when the measured concentration is not within the desired concentration range to bring the concentration of conditioning agent in the boiler flue gas within the desired concentration range.

2. The method of claim 1 and further including the step of determining the sulfur content of coal to be burned and determining the desired concentration range based on the sulfur content of the coal to be burned, the step of providing a conditioning agent at a controlled rate comprising providing sulfur trioxide at a controlled rate and the step of measuring the concentration of the conditioning agent in the boiler flue gas comprises measuring the concentration of sulfur trioxide in the boiler flue gas.

3. The method of claim 2 wherein the step of providing sulfur trioxide at a controlled rate comprises providing elemental sulfur at a controlled flow rate to a sulfur furnace which combusts the sulfur dioxide into combustion products, providing the combustion products to a catalytic converter which converts the sulfur dioxide to sulfur trioxide to provide the sulfur trioxide conditioning agent, and the step of adjusting the controlled flow of conditioning agent when the measured concentration is not within the desired concentration range comprises adjusting the controlled flow of the elemental sulfur to the sulfur furnace.

4. The method of claim 2 wherein the step of providing sulfur trioxide at a controlled rate comprises providing liquid sulfur trioxide to a vaporizer which converts the liquid sulfur trioxide to gaseous sulfur trioxide to provide the sulfur trioxide conditioning agent.

5. The method of claim 2 wherein the step of providing sulfur trioxide at a controlled rate comprises providing liquid sulfur dioxide to a vaporizer which converts the liquid sulfur dioxide to gaseous sulfur dioxide and providing the gaseous sulfur dioxide to a catalytic converter which converts the sulfur dioxide to sulfur trioxide to provide the sulfur trioxide conditioning agent.

6. The method of claim 1 and further including the step of determining the concentration of sulfur dioxide in the boiler flue gas and determining the desired concentration range based on the determined sulfur dioxide concentration, the step of providing a conditioning agent at a controlled rate comprising providing sulfur trioxide at a controlled rate and the step of measuring the concentration of the conditioning agent in the boiler flue gas comprises measuring the concentration of sulfur trioxide in the boiler flue gas.

7. The method of claim 1 wherein the boiler flue gas is directed into a stack after passing through the electrostatic precipitator, and further including the steps of measuring the opacity of the boiler flue gas effluent in the stack and adjusting the power level of the electrostatic precipitator to minimize the opacity of the flue gas in the stack.

8. The method of claim 7 wherein the step of adjusting the power level of the electrostatic precipitator includes determining the minimum power level necessary to minimize opacity of the flue gas in the stack and adjusting the power level of the electrostatic precipitator to the minimum necessary power level to minimize opacity of the boiler flue gas in the stack.

9. A method of conditioning a boiler flue gas for removal of entrained particulate matter by an electrostatic precipitator, comprising the steps of:
   a. providing a flow of sulfur trioxide at a controlled rate;
   b. mixing the sulfur trioxide with the boiler flue gas to condition the boiler flue gas;
   c. directing the boiler flue gas mixed with the sulfur trioxide through an electrostatic precipitator;
   d. determining a desired concentration range of sulfur trioxide in the boiler flue gas;
   e. periodically measuring the concentration of the sulfur trioxide in the boiler flue gas with a mass spectrometer;
   f. comparing the measured concentration of sulfur trioxide in the boiler flue gas to the desired concentration range; and
   g. adjusting the controlled flow of sulfur trioxide when the measured sulfur trioxide concentration is not within the desired concentration range to bring the concentration of sulfur trioxide in the boiler flue gas to within the desired concentration range.

10. The method of claim 9 wherein the step of determining the desired concentration range of sulfur trioxide comprises periodically measuring the concentration of sulfur dioxide in the boiler flue gas with a mass spectrometer and determining the desired concentration range based on the measured concentration of sulfur dioxide.

11. The method of claim 9 wherein the step of determining the desired concentration range of sulfur trioxide comprises determining the sulfur content of coal to be burned and determining the desired concentration range of sulfur trioxide based on the determined sulfur content of the coal to be burned.

12. A method of controlling a boiler which burns coal, comprising the steps of:
   a. measuring the flue gas with a mass spectrometer to obtain at least one parameter indicative of the chemistry of flue gas emitted by the boiler;
   b. comparing the measured parameter to a desired parameter;
   c. controlling the boiler based on the comparison of the measured parameter to the desired parameter to operate the boiler so as to obtain and maintain the measured parameter within a desired range of the desired parameter.

13. A boiler system having a flue gas duct for conveying flue gas from a fuel combustion chamber of the boiler to a particulate removing device, the boiler system having a system for conditioning the flue gas by introducing a conditioning agent into the flue duct for mixing with the flue gas, the improvement comprising:
   a. means for providing a flow of the conditioning agent at a controlled rate;
   b. means coupled to the conditioning agent providing means for introducing the conditioning agent into the flue duct for mixing with the flue gas;
   c. means coupled to the flue duct for periodically measuring the concentration of the conditioning agent in the flue gas;
   d. control means coupled to the measuring means and the conditioning agent providing means for comparing the measured concentration of flue gas with a desired concentration range stored in a memory of the control means and adjusting the controlled flow of conditioning agent when the measured concentration is not within the desired range to bring the concentration of conditioning agent in the flue gas within the desired range.

14. The system of claim 13 wherein the means for measuring the concentration of the conditioning agent in the flue gas comprises a mass spectrometer.

15. The system of claim 14 and further including means coupled to the control means for measuring a parameter of the flue gas related to its chemistry, the control means including means for determining the desired concentration range based on the measured parameter of the flue gas related to the flue gas' chemistry and storing said desired concentration in the memory of the control means.

16. The system of claim 15 wherein said mass spectrometer comprises the means for measuring said parameter of the flue gas related to its chemistry.

17. The system of claim 15 wherein said conditioning agent comprises sulfur trioxide and the means for producing a flow of conditioning agent at a controlled rate comprises means for producing a flow of sulfur trioxide at a controlled rate and the mass spectrometer measuring the concentration of sulfur trioxide in the flue gas.

18. The system of claim 17 wherein the means for measuring the parameter of the flue gas related to the flue gas' chemistry comprises means for measuring the sulfur content of coal to be burned, said sulfur content comprising said parameter.

19. The system of claim 15 wherein the means for measuring the parameter of the flue gas related to the flue gas' chemistry comprises means for periodically measuring the sulfur dioxide concentration in the flue gas.

20. The system of claim 19 wherein said parameter comprises the concentration of sulfur dioxide in the flue gas, the measuring means including a mass spectrometer and means for causing the mass spectrometer to periodically measure the sulfur trioxide concentration in the flue gas.

* * * * *